United States Patent
Oqaily et al.

(10) Patent No.: US 11,314,884 B2
(45) Date of Patent: Apr. 26, 2022

(54) PRIVACY-PRESERVING DATA VERIFICATION

(71) Applicant: Telefonaktiebolaget LM Ericsson (publ), Stockholm (SE)

(72) Inventors: Momen Oqaily, Montreal (CA); Yosr Jarraya, Montreal (CA); Lingyu Wang, Montreal (CA); Makan Pourzandi, Montreal (CA); Mourad Debbabi, Dollard des Ormeaux (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/769,662

(22) PCT Filed: Feb. 28, 2018

(86) PCT No.: PCT/IB2018/051288
§ 371 (c)(1),
(2) Date: Jun. 4, 2020

(87) PCT Pub. No.: WO2019/116112
PCT Pub. Date: Jun. 20, 2019

(65) Prior Publication Data
US 2021/0182418 A1 Jun. 17, 2021

Related U.S. Application Data

(60) Provisional application No. 62/597,673, filed on Dec. 12, 2017.

(51) Int. Cl.
*G06F 21/62* (2013.01)
*G06F 21/60* (2013.01)
*H04L 9/14* (2006.01)

(52) U.S. Cl.
CPC ........ *G06F 21/6227* (2013.01); *G06F 21/602* (2013.01); *G06F 21/6254* (2013.01); *H04L 9/14* (2013.01)

(58) Field of Classification Search
CPC .............. G06F 21/6227; G06F 21/602; G06F 21/6254; H04L 9/14
See application file for complete search history.

(56) References Cited

U.S. PATENT DOCUMENTS 9,230,132 B2 * 1/2016 Gkoulalas-Divanis ...................... G06F 21/6227
9,489,538 B2 8/2016 Vyas et al.
(Continued)

FOREIGN PATENT DOCUMENTS

EP 3 166 042 A1 5/2017
WO 2014/049605 A1 4/2014
(Continued)

OTHER PUBLICATIONS

International Search Report and Written Opinion of the International Searching Authority dated Jul. 17, 2018 issued in PCT Application No. PCT/IB2018/051288, consisting of 15 pages.
(Continued)

*Primary Examiner* — Ayoub Alata
(74) *Attorney, Agent, or Firm* — Christopher & Weisberg, P.A.

(57) ABSTRACT

A node includes processing circuitry configured to encrypt first network data including a first tenant identifier using a first cryptographic key to generate first encrypted data and anonymize the first encrypted data to generate anonymized data where the anonymizing of the first encrypted data includes segmenting the first encrypted data and the anonymizing of the first encrypted data preserving relationships among the first network data associated with the first tenant identifier, encrypt the anonymized data using a second (Continued)

cryptographic key to generate encrypted anonymized data, transmit the encrypted anonymized data, at least one analysis parameter, at least one security policy and instructions to analyze the encrypted anonymized data using the at least one analysis parameter, the at least one security policy and the second cryptographic key, receive analysis data resulting from the analysis of the encrypted anonymized data, and determine verification results from the received analysis data.

22 Claims, 15 Drawing Sheets

(56) References Cited

U.S. PATENT DOCUMENTS

| | | | |
|---|---|---|---|
| 2013/0173917 | A1 | 7/2013 | Clifton et al. |
| 2014/0043239 | A1 | 2/2014 | Agrawal et al. |
| 2015/0169895 | A1* | 6/2015 | Gkoulalas-Divanis ..................... G06F 21/6254 726/26 |
| 2016/0078239 | A1* | 3/2016 | Beiter ................. G06F 21/6209 713/164 |
| 2016/0147945 | A1* | 5/2016 | MacCarthy ......... G06F 21/6254 705/51 |
| 2016/0283661 | A1* | 9/2016 | Zwinger ................ G16H 10/60 |
| 2017/0124335 | A1* | 5/2017 | Freudiger ........... G06F 21/6254 |
| 2017/0124336 | A1* | 5/2017 | Freudiger ........... G06F 21/6254 |
| 2018/0004978 | A1 | 1/2018 | Hebert et al. |

FOREIGN PATENT DOCUMENTS

| | | |
|---|---|---|
| WO | 2015/016828 A1 | 2/2015 |
| WO | 2016/057347 A1 | 4/2016 |

OTHER PUBLICATIONS

Tonnes Brekne et al., Anonymization of IP Traffic Monitoring Data: Attacks on Two Prefix-Preserving Anonymization Schemes and Some Proposed Remedies, Centre for Quantifiable Quality of Service in Communication Systems, Springer-Verlag, Berlin, Heidelberg, 2006, consisting of 18 pages.
Tonnes Brekne et al., Circumventing IP-Address Pseudonymization, Centre for Quantifiable Quality of Service in Communication Systems, Norwegian University of Science and Technology, Oct. 2005, consisting of 6 pages.
Fei Chen et al., Privacy-Preserving Cross-Domain Network Reachability Quantification; 2011 19th IEEE International Conference on Network Protocols, consisting of 10 pages.
Valentina Ciriani, Fragmentation and Encryption to Enforce Privacy in Data Storage; European Symposium on Researching Computer Security, Berlin, Germany, 2007, consisting 16 pages.
George T. Duncan et al., Disclosure Limitation Methods and Information Loss for Tabular Data, Confidentiality, Disclosure and Data Access: Theory and Practical Applications for Statistical Agencies, May 24, 2001, consisting of 31 pages.
Jinliang Fan, Prefix-Preserving IP Address Anonymization: Measurement-Based Security Evaluation and a New Cryptography-Based Scheme, Computer Networks, Elsevier, Amsterdam, Oct. 7, 2004, consisting of 20 pages.
Rosario Gennaro et al., Non-Interactive Verifiable Computing: Outsourcing Computation to Untrusted Workers, International Association for Cryptologic Research, 2010, consisting of 17 pages.
Justin King et al., A Taxonomy and Adversarial Model for Attacks Against Network Log Anonymization, Honolulu, Hawaii, Mar. 2009; Proceedings of the 2009 ACM Symposium on Applied Computing, consisting of 8 pages.
Adam J. Lee et al., A Privacy-Preserving Interdomain Audit Framework, Proceedings of the 6th ACM Workshop on Privacy in Electronic Safety, ACM 2006, consisting of 10 pages.
Ashwin Machanavajjhala et al., I-Diversity: Privacy Beyond k-Anonymity, Procedures of the 22nd IEEE International Conference on Data Engineering (ICDE), Atlanta, Georgia, 2006, consisting of 12 pages.
Cristian Morariu et al., Design and Implementation of a Distributed Platform for Sharing IP Flow Records, Department of Informatics, IFI, University of Zurich, Switzerland, Springer International Publishing, Oct. 2009, consisting of 14 pages.
Ruoming Pang et al., The Devil and Packet Trace Anonymization, Princeton University, International Computer Science Institute, Lawrence Berkeley National Laboratory (LBNL), ACM Computer Communication Review, vol. 36, No. 1, Jan. 2006, consisting of 10 pages.
Bruno Ribeiro et al., Analyzing Privacy in Enterprise Packet Trace Anonymization, UMass CMPSCI Technical Report 48-07, Sep. 2007, consisting of 17 pages.
Daniele Riboni et al., Obfuscation of Sensitive Data in Network Flows, INFOCOM, 2012 Proceedings IEEE. IEEE, 2012, consisting of 9 pages.
Samarati et al., Protecting Privacy When Disclosing Information: k-Anonymity and Its Enforcement Through Generalization and Suppression, Technical Report, SRI International, 1998, consisting of 19 pages.
Samarati, Pierangela, Protecting Respondents' Identities in Microdata Release, IEEE Transactions of Knowledge and Data Engineering 13.6 (2001), consisting of 29 pages.
Adam J. Slagell et al., Sharing Computer Network Logs for Security and Privacy: A Motivation for New Methodologies of Anonymization, National Center for Supercomputing Applications, University of Illinois, Sep. 2004, consisting of 17 pages.
Truta et al., Privacy Protection: p-Sensitive k-Anonymity Property, Data Engineering Workshops, 2006 Proceedings, 22nd International Conference on Management of Data. ACM 2006, consisting of 10 pages.
Avishai Wool, A Quantative Study of Firewall Configuration Errors, Computer 37.6, Jun. 2004, consisting of 6 pages.
Xiaokui Xiao et al., Personalized Privacy Preservation, Proceedings of the 2006 Acm Sigmod International Conference on Management of Data. ACM, Jun. 27-29, 2006, consisting of 12 pages.
Jun Xu, et al., Prefix-Preserving IP Address Anonymization: Measurement-Based Security Evaluation and a New Cryptography-Based Scheme, Proceedings of the 10th IEEE International Conference on Network Protocols, 2002, consisting of 10 pages.
Ting-Fan Yen et al., Browser Fingerprinting from Coarse Traffic Summaries: Techniques and Implications, Proc. of Detection of Intrusions and Malware & Vulnerability Assessment, vol. 5587, Springer, 2009, consisting of 19 pages.
International Search Report and Written Opinion of the International Searching Authority dated May 22, 2018 issued in PCT Application No. PCT/IB2018/051293, consisting of 14 pages.
International Preliminary Report on Patentability dated Sep. 12, 2019 issued in PCT Application No. PCT/IB2018/051293, consisting of 10 pages.

* cited by examiner

| Tenant ID | Network ID | Network IP | VM ID | VM Private IP | VM Public IP | Virtual Router ID | Interface ID | Interface IP |
|---|---|---|---|---|---|---|---|---|
| 1234 | AB1 | 10.0.1.0 | CD1 | 10.0.1.18 | 1.10.10.1 | EF1 | GH1 | 10.0.1.1 |
| 1234 | AB3 | 10.0.3.0 | CD8 | 10.0.3.42 | 1.10.10.3 | EF3 | GH3 | 10.0.3.1 |
| 5678 | AB4 | 18.1.1.0 | CD9 | 18.1.1.34 | 1.10.10.4 | EF4 | GH4 | 18.1.1.1 |
| 5678 | AB6 | 18.1.3.0 | CD4 | 18.1.3.9 | 1.10.10.2 | EF2 | GH2 | 18.1.3.1 |
| 1234 | AB3 | 10.0.3.0 | CD5 | 10.0.3.27 | 1.10.10.7 | EF3 | GH3 | 10.0.3.1 |
| 1234 | AB1 | 10.0.1.0 | CD2 | 10.0.1.19 | 1.10.10.6 | EF1 | GH1 | 10.0.1.1 |
| 5678 | AB4 | 18.1.1.0 | CD6 | 18.1.1.66 | 1.10.10.9 | EF4 | GH4 | 18.1.1.1 |
| 1234 | AB1 | 10.0.1.0 | CD3 | 10.0.1.12 | 1.10.10.8 | EF1 | GH1 | 10.0.1.1 |
| 5678 | AB5 | 18.1.2.0 | CD7 | 18.1.1.43 | 1.10.10.5 | EF5 | GH5 | 18.1.2.1 |
| 5678 | AB5 | 18.1.2.0 | CD8 | 18.1.1.92 | 1.10.10.5 | EF5 | GH5 | 18.1.2.1 |

Figure 1

| Tenant ID | Network ID | Network IP | VM ID | VM Private IP | VM Public IP | Router ID | Interface ID | Interface IP |
|---|---|---|---|---|---|---|---|---|
| 9998 | X1X | 66.22.10.1 | VVV | 66.22.10.3 | 1.10.10.1 | WW1 | MM1 | 66.22.10.76 |
| 9998 | X3C | 66.22.7.9 | MX2 | 66.22.7.66 | 1.10.10.3 | WW3 | MM3 | 66.22.7.6 |
| 5554 | ZQA | 98.6.5.4 | SQ1 | 98.6.41.82 | 1.10.10.4 | WW4 | MM4 | 98.6.41.54 |
| 5554 | XEW | 98.6.15.3 | VV1 | 98.6.15.43 | 1.10.10.2 | WW2 | MM2 | 98.6.15.85 |
| 9998 | X3C | 66.22.7.9 | MZD | 66.22.7.62 | 1.10.10.3 | WW3 | MM3 | 66.22.7.6 |
| 9998 | X1X | 66.22.10.1 | MND | 66.22.10.74 | 1.10.10.1 | WW1 | MM1 | 66.22.10.76 |
| 5554 | ZQA | 98.6.5.4 | TT1 | 98.6.41.22 | 1.10.10.4 | WW4 | MM4 | 98.6.41.54 |
| 9998 | X1X | 66.22.10.1 | GTQ | 66.22.10.34 | 1.10.10.1 | WW1 | MM1 | 66.22.10.76 |
| 5554 | CCY | 98.6.41.2 | TT2 | 98.6.41.13 | 1.10.10.5 | WW5 | MM5 | 98.6.41.32 |
| 5554 | CCY | 98.6.41.2 | TEQ | 98.6.41.72 | 1.10.10.5 | WW5 | MM5 | 98.6.41.32 |

Figure 3

| Tenant ID | Network ID | Network IP | VM ID | VM Private IP | VM Public IP | Router ID | Interface ID | Interface IP |
|---|---|---|---|---|---|---|---|---|
| 9998 | X1X | 66.22.10.1 | VVV | 66.22.10.3 | 1.10.10.1 | WW1 | MM1 | 66.22.10.76 |
| 5554 | ZQA | 98.6.5.4 | TT1 | 98.6.41.22 | 1.10.10.4 | WW4 | MM4 | 98.6.41.54 |
| 9998 | X1X | 66.22.10.1 | MND | 66.22.10.74 | 1.10.10.1 | WW1 | MM1 | 66.22.10.76 |
| 5554 | ZQA | 98.6.5.4 | SQ1 | 98.6.41.82 | 1.10.10.4 | WW4 | MM4 | 98.6.41.54 |
| 9998 | X1X | 66.22.10.1 | GTQ | 66.22.10.34 | 1.10.10.1 | WW1 | MM1 | 66.22.10.76 |
| 5554 | CCY | 98.6.41.2 | TT2 | 98.6.41.13 | 1.10.10.5 | WW5 | MM5 | 98.6.41.32 |
| 9998 | X3C | 66.22.7.9 | MX2 | 66.22.7.66 | 1.10.10.3 | WW3 | MM3 | 66.22.7.6 |
| 5554 | CCY | 98.6.41.2 | TEQ | 98.6.41.72 | 1.10.10.5 | WW5 | MM5 | 98.6.41.32 |
| 9998 | X3C | 66.22.7.9 | MZD | 66.22.7.62 | 1.10.10.3 | WW3 | MM3 | 66.22.7.6 |
| 5554 | XEW | 98.6.15.3 | VV1 | 98.6.15.43 | 1.10.10.2 | WW2 | MM2 | 98.6.15.85 |

Figure 4

| Tenant ID | Network ID | Network IP | VM ID | VM Private IP | VM Public IP | Router ID | Interface ID | Interface IP |
|---|---|---|---|---|---|---|---|---|
| 9865 | IO1 | 162.2.10.1 | KK2 | 162.2.10.12 | 1.10.10.1 | QW1 | HGQ | 162.2.10.1 |
| 5684 | OI1 | 75.81.15.3 | WE2 | 75.81.15.34 | 1.10.10.4 | LA4 | MSA | 75.81.15.85 |
| 3456 | X12 | 69.35.7.9 | WSA | 69.35.7.92 | 1.10.10.1 | WDS | CSA | 69.35.7.6 |
| 8745 | 12W | 34.16.5.4 | W5F | 34.16.5.40 | 1.10.10.4 | W5R | RE4 | 34.16.41.54 |
| 6571 | Q4E | 74.99.41.2 | WQ1 | 74.99.41.52 | 1.10.10.1 | W3S | QL1 | 74.99.41.32 |
| 4682 | Dfd | 65.32.4.7 | 2K1 | 65.32.4.67 | 1.10.10.5 | QW5 | HG5 | 65.32.4.32 |
| 2894 | LMK | 17.12.45.31 | VCS | 17.12.45.91 | 1.10.10.2 | QSC | MB2 | 17.12.45.14 |
| 3476 | NNV | 89.7.89.12 | MUI | 89.7.89.52 | 1.10.10.5 | IU5 | M7I | 89.7.89.22 |
| 9761 | CNN | 32.14.51.71 | MS4 | 32.14.51.93 | 1.10.10.3 | MN3 | M8U | 32.14.51.81 |
| 6482 | NNX | 14.17.84.15 | FD5 | 14.17.84.45 | 1.10.10.3 | SZ3 | MT5 | 14.17.84.92 |

Figure 5

$$\text{EncMatrix} = \begin{pmatrix} 9 & 12 & 15 & 13 & 8 & 10 & 12 & 8 & 16 & 8 \\ 7 & 6 & 8 & 9 & 14 & 9 & 8 & 8 & 9 & 15 \\ 11 & 13 & 9 & 13 & 17 & 14 & 13 & 16 & 14 & 10 \\ 10 & 6 & 11 & 10 & 11 & 7 & 10 & 11 & 10 & 12 \\ 10 & 13 & 8 & 12 & 8 & 8 & 9 & 8 & 12 & 15 \end{pmatrix}$$

| Tenant ID | Network ID | Network IP | VM ID | VM Private IP | VM Public IP | Router ID | Interface ID | Interface IP |
|---|---|---|---|---|---|---|---|---|
| 9865 | IO1 | 162.2.10.1 | KK2 | 162.2.10.12 | 1.10.10.1 | QW1 | HGQ | 162.2.10.1 |
| 5684 | OI1 | 75.81.15.3 | WE2 | 75.81.15.34 | 1.10.10.4 | LA4 | MSA | 75.81.15.85 |
| 3456 | X12 | 69.35.7.9 | WSA | 69.35.7.92 | 1.10.10.1 | WDS | CSA | 69.35.7.6 |
| 8745 | 12W | 34.16.5.4 | W5F | 34.16.5.40 | 1.10.10.4 | W5R | RE4 | 34.16.41.54 |
| 6571 | Q4E | 74.99.41.2 | WQ1 | 74.99.41.52 | 1.10.10.1 | W3S | QL1 | 74.99.41.32 |
| 4682 | Dfd | 65.32.4.7 | 2K1 | 65.32.4.67 | 1.10.10.5 | QW5 | HG5 | 65.32.4.32 |
| 2894 | LMK | 17.12.45.31 | VCS | 17.12.45.91 | 1.10.10.2 | QSC | MB2 | 17.12.45.14 |
| 3476 | NNV | 89.7.89.12 | MUI | 89.7.89.52 | 1.10.10.5 | IU5 | M7I | 89.7.89.22 |
| 9761 | CNN | 32.14.51.71 | MS4 | 32.14.51.93 | 1.10.10.3 | MN3 | M8U | 32.14.51.81 |
| 6482 | NNX | 14.17.84.15 | FD5 | 14.17.84.45 | 1.10.10.3 | SZ3 | MT5 | 14.17.84.92 |

Figure 6

$$\text{EncMatrix}\_p = \begin{Bmatrix} 11 & 13 & 9 & 13 & 17 & 14 & 13 & 16 & 14 & 10 \\ 10 & 6 & 11 & 10 & 11 & 7 & 10 & 11 & 10 & 12 \\ 7 & 6 & 8 & 9 & 14 & 9 & 8 & 8 & 9 & 15 \\ 10 & 13 & 8 & 12 & 8 & 8 & 9 & 8 & 12 & 15 \\ 9 & 12 & 15 & 13 & 8 & 10 & 12 & 8 & 16 & 8 \end{Bmatrix}$$

SegLog_p=

| Tenant ID | Network ID | Network IP | VM ID | VM Private IP | VM Public IP | Route rID | Interface eID | Interface IP |
|---|---|---|---|---|---|---|---|---|
| 6571 | Q4E | 74.99.41.2 | WQ1 | 74.99.41.52 | 1.10.10.1 | W3S | QL1 | 74.99.41.3 |
| 4682 | Dfd | 65.32.4.7 | 2K1 | 65.32.4.67 | 1.10.10.5 | QW5 | HG5 | 65.32.4.32 |
| 2894 | LMK | 17.12.45.31 | VCS | 17.12.45.91 | 1.10.10.2 | QSC | MB2 | 17.12.45.14 |
| 3476 | NNV | 89.7.89.12 | MUI | 89.7.89.52 | 1.10.10.5 | IU5 | M7I | 89.7.89.22 |
| 3456 | X12 | 69.35.7.9 | WSA | 69.35.7.92 | 1.10.10.1 | WDS | CSA | 69.35.7.6 |
| 8745 | 12W | 34.16.5.4 | W5F | 34.16.5.40 | 1.10.10.4 | W5R | RE4 | 34.16.41.54 |
| 9761 | CNN | 32.14.51.71 | MS4 | 32.14.51.93 | 1.10.10.3 | MN3 | M8U | 32.14.51.81 |
| 6482 | NNX | 14.17.84.15 | FD5 | 14.17.84.45 | 1.10.10.3 | SZ3 | MT5 | 14.17.84.92 |
| 9865 | IO1 | 162.2.10.1 | KK2 | 162.2.10.12 | 1.10.10.1 | QW1 | HGQ | 162.2.10.1 |
| 5684 | OI1 | 75.81.15.3 | WE2 | 75.81.15.34 | 1.10.10.4 | LA4 | MSA | 75.81.15.85 |

Figure 7

| Tenant ID | Network ID | Network IP | VM ID | VM Private IP | VM Public IP | Router ID | Interface ID | Interface IP |
|---|---|---|---|---|---|---|---|---|
| 2478 | 11E | 63.89.65.1 | I3I | 63.89.65.15 | 1.10.10.1 | KL6 | UT0 | 63.89.65.3 |
| 5678 | 4F3 | 89.698.45.8 | 9KL | 89.698.45.6 | 1.10.10.5 | OP3 | 2WE | 89.698.45.1 |
| 6589 | ZQ8 | 150.8.11.8 | WQ6 | 150.8.11.9 | 1.10.10.2 | VB2 | GG7 | 150.8.11.6 |
| 1234 | XZZ | 12.14.0.54 | U2U | 12.14.0.5 | 1.10.10.5 | JH8 | HJ8 | 12.14.0.6 |
| 7231 | NJ2 | 87.65.7.9 | WSA | 87.65.7.2 | 1.10.10.1 | WDS | CSA | 87.65.7.32 |
| 8013 | 18W | 24.86.5.4 | W5F | 24.86.5.12 | 1.10.10.4 | W5R | RE4 | 24.86.5.67 |
| 6761 | CNN | 36.74.51.76 | M8P | 36.74.51.46 | 1.10.10.3 | HN3 | M54 | 36.74.51.7 |
| 3482 | NNX | 19.14.84.77 | T35 | 19.14.84.27 | 1.10.10.3 | KJ3 | MB4 | 19.14.84.72 |
| 7231 | NJ2 | 87.65.7.9 | KFD | 87.65.7.65 | 1.10.10.1 | NW1 | 3DQ | 87.65.7.32 |
| 8013 | 18W | 24.86.5.4 | W7H | 24.86.5.24 | 1.10.10.4 | HA4 | 9IA | 24.86.5.67 |

Figure 8

| Tenant ID | Network ID | Network IP | VM ID | VM Private IP | VM Public IP | Router ID | Interface ID | Interface IP |
|---|---|---|---|---|---|---|---|---|
| 7676 | GGF | 18.2.9.8 | WQ1 | 17.2.9.4 | 1.10.10.1 | NJ1 | O31 | 18.2.9.81 |
| 5143 | 23E | 98.62.1.7 | 2K1 | 98.62.1.71 | 1.10.10.5 | PLM | O23 | 98.62.1.9 |
| 7238 | 1W2 | 14.15.89.5 | VCS | 14.15.89.54 | 1.10.10.2 | PP9 | OO4 | 14.15.89.21 |
| 9651 | DDF | 25.6.99.1 | MUI | 25.6.99.11 | 1.10.10.5 | HMH | OI2 | 25.6.99.13 |
| 3456 | 4TF | 18.2.6.5 | WSA | 18.2.6.12 | 1.10.10.1 | NF5 | 6Y1 | 18.2.6.2 |
| 8045 | 1UW | 34.16.5.4 | W5F | 34.16.5.32 | 1.10.10.4 | W5R | RE4 | 34.16.41.4 |
| 9661 | K2N | 32.14.51.71 | 8H4 | 32.14.51.79 | 1.10.10.3 | MN3 | M8U | 32.14.51.84 |
| 5282 | P8X | 14.17.84.15 | L85 | 14.17.84.53 | 1.10.10.3 | SZ3 | MT5 | 14.17.84.62 |
| 7676 | GGF | 18.2.9.32 | WQ1 | 17.2.9.24 | 1.10.10.1 | NJ1 | O31 | 18.2.9.81 |
| 5143 | 23E | 98.62.1.41 | 2K1 | 98.62.1.67 | 1.10.10.5 | PLM | O23 | 98.62.1.9 |

Figure 9

PRIVACY-PRESERVING DATA VERIFICATION

CROSS-REFERENCE TO RELATED APPLICATIONS

This Application is a Submission Under 35 U.S.C. § 371 for U.S. National Stage Patent Application of International Application No.: PCT/IB2018/051288, filed Feb. 28, 20218 entitled "PRIVACY-PRESERVING DATA VERIFICATION," which claims priority to U.S. Provisional Application No. 62/597,673, filed Dec. 12, 2017, entitled "PRIVACY-PRESERVING DATA VERIFICATION," the entireties of both of which are incorporated herein by reference.

FIELD

The present disclosure generally relates to communication networks and security.

INTRODUCTION

Data outsourcing for auditing and verification purposes is a requirement due to the complexity of the analysis task, the computation cost if the data size is vast, and to have an accurate analysis results. A lack of trust between two parties could lead them to recruit a third party to perform the analysis. Furthermore, such information could be an interest for both industry and academia for developing tools, log analysis, find security breaches and many other research purposes. For example, in a cloud computing environment the scalability, sheer size and the lack of trust between tenant(s) and cloud service provider(s) may result in the outsourcing of a tenant's data. However, to obtain valid and accurate analysis results, data belonging to all tenants in the environment should be outsourced even if there are some tenants not requesting the verification or because the log files and configuration data are related to multiple tenants and cannot be split. Outsourcing such information is a concern due to security and privacy issues of the corresponding tenants, as it could potentially lead to exposing their virtual network topologies, virtual resources identifiers, private IP addresses and other sensitive attributes.

A tenant's "reachability" for a given cloud infrastructure is defined as the set of packets that are allowed by all infrastructure components on the path between source and destination. Reachability verification is one of the key factors in understanding tenant's behavior and detecting any violation and misconfiguration which could be a major cause of loss of services for business applications and sensitive communication. To perform an accurate analysis, the tenant needs to collect all the reachability configurations from virtual routers, switches, and machines. Collecting such information can be a concern for tenants due to security and privacy issues. Also, the scalability and complexity of the cloud can make it computationally expensive.

Many approaches have been proposed to verify network reachability. One technique, probing, relies on sending probing packets to avoid outsourcing sensitive reachability information (e.g. reachability configuration). A drawback of this technique is its inaccuracy because it cannot probe open ports without a server listening to them. Analysts and researchers note that outsourcing the sensitive reachability information for verification is a must, so they propose a second technique to address this problem, the main assumption being that all the sensitive reachability information, configuration state(s), and network device(s) are known to a central analyst who is doing the verification. However, this assumption is potentially a problem, especially in the cloud environment, since both virtual network infrastructure and physical resources could be shared between different independent tenants or even competitors which should not leak any confidential data cross-tenant even to the analyst. In the cloud environment, a cloud service provider may try to hide the reachability analysis results from the tenants for many reasons, especially if it reveals security breaches.

Keeping the reachability information hidden from unauthorized parties is important since this information could have security breaches and holes due to misconfiguration that can be exploited by adversaries if it is exposed. In practice, neither cloud providers nor private tenants disclose their reachability information since most of firewalls and packet filters have security holes. Such information could have sensitive attributes that should be kept private, e.g. private IPs, infrastructure IDs, routing rules policies, security group rules, and many other attributes. If such information is captured by an adversary, it could be used to understand the security policies used by a given tenant and abuse it to parasitize or even disrupt services for other tenants. In practice, no one other than the administrators can access the reachability configuration even within the same organization.

SUMMARY

It is an object of the present disclosure to obviate or mitigate at least one disadvantage of the prior art.

In a first aspect of the present disclosure, there is provided systems and methods for tenant data verification.

The various aspects and embodiments described herein can be combined alternatively, optionally and/or in addition to one another.

Other aspects and features of the present disclosure will become apparent to those ordinarily skilled in the art upon review of the following description of specific embodiments in conjunction with the accompanying figures.

According to one embodiment of the disclosure, a node for anonymizing network data for analysis by another node is provided. The network node includes processing circuitry configured to encrypt first network data including a first tenant identifier using a first cryptographic key to generate first encrypted data and anonymize the first encrypted data to generate anonymized data where the anonymizing of the first encrypted data including segmenting the first encrypted data based at least in part on the encrypted first tenant identifier and where the anonymizing of the first encrypted data preserving relationships among the first network data associated with the first tenant identifier. The processing circuitry is further configured to encrypt the anonymized data using a second cryptographic key to generate encrypted anonymized data, transmit the encrypted anonymized data, at least one analysis parameter, at least one security policy and instructions to analyze the encrypted anonymized data using the at least one analysis parameter, the at least one security policy and the second cryptographic key, receive analysis data resulting from the analysis of the encrypted anonymized data, and determine verification results from the received analysis data.

According to one embodiment of this aspect, the at least one analysis parameter is a two dimensional matrix where values of the two dimensional matrix indicate a quantity of times to apply a cryptographically based function to a segment of the encrypted anonymized data using the second cryptographic key. According to one embodiment of this aspect, a quantity of columns in the two dimensional matrix indicates a quantity of copies of the encrypted anonymized data to generate. The instructions to analyze the encrypted anonymized data includes instructions to generate a plurality of data views, each data view corresponding to an application of a respective column of the two dimensional matrix to a respective copy of the encrypted anonymized data. According to one embodiment of this aspect, each data view includes a portion that preserves relationships among the first network data associated with a first tenant identifier; and a portion that fails to preserve relationships among the first network data associated with a first tenant identifier.

According to one embodiment of this aspect, a quantity of rows in the two dimensional matrix correspond to a quantity of segments in the encrypted anonymized data. According to one embodiment of this aspect, the anonymizing of the first encrypted data includes pairing each row of the two dimensional matrix with a respective segment of the first encrypted data, and modifying an ordering of rows of the two dimensional matrix and corresponding segments of the first encrypted data. According to one embodiment of this aspect, the processing circuitry is further configured to: encrypt second data including a second tenant identifier using the second cryptographic key to generate second encrypted data, and anonymize the second encrypted data to generate a portion of the anonymized data where the anonymizing of the second encrypted data including segmenting the second encrypted data based at least in part on the encrypted second tenant identifier and where the anonymizing of the second encrypted data preserving relationships among the second data associated with a second tenant identifier.

According to one embodiment of this aspect, at least one segment of encrypted anonymized data includes first encrypted data and second encrypted data. According to one embodiment of this aspect, the determining of verification results from the received analysis data includes determining a quantity of times at least one segment of the verification results that correspond to the network data was encrypted. According to one embodiment of this aspect, the processing circuitry is further configured to transmit the second cryptographic key.

According to another aspect of the disclosure, a method for anonymizing network data for analysis by another node is provided. First network data including a first tenant identifier is encrypted using a first cryptographic key to generate first encrypted data. The first encrypted data is anonymized to generate anonymized data where the anonymizing of the first encrypted data includes segmenting the first encrypted data based at least in part on the encrypted first tenant identifier and where the anonymizing of the first encrypted data preserves relationships among the first network data associated with the first tenant identifier. The anonymized data is encrypted using a second cryptographic key to generate encrypted anonymized data. The encrypted anonymized data, at least one analysis parameter, at least one security policy and instructions to analyze the encrypted anonymized data using the at least one analysis parameter, the at least one security policy and the second cryptographic key, are transmitted. Analysis data resulting from the analysis of the encrypted anonymized data are received. Verification results from the received analysis data are determined.

According to one embodiment of this aspect, the at least one analysis parameter is a two dimensional matrix where values of the two dimensional matrix indicate a quantity of times to apply a cryptographically based function to a segment of the encrypted anonymized data using the second cryptographic key. According to one embodiment of this aspect, a quantity of columns in the two dimensional matrix indicate a quantity of copies of the encrypted anonymized data to generate. The instructions to analyze the encrypted anonymized data includes instructions to generate a plurality of data views, each data view corresponding to an application of a respective column of the two dimensional matrix to a respective copy of the encrypted anonymized data.

According to one embodiment of this aspect, each data view includes a portion that preserves relationships among the first network data associated with a first tenant identifier, and a portion that fails to preserve relationships among the first network data associated with a first tenant identifier. According to one embodiment of this aspect, a quantity of rows in the matrix correspond to a quantity of segments in the encrypted anonymized data. According to one embodiment of this aspect, the anonymizing of the first encrypted data includes pairing each row of the matrix with a respective segment of the first encrypted data, and modifying an ordering of rows of the matrix and corresponding segments of the first encrypted data.

According to one embodiment of this aspect, encrypting second data including a second tenant identifier is encrypted using the second cryptographic key to generate second encrypted data. The second encrypted data is anonymized to generate a portion of the anonymized data where the anonymizing of the second encrypted data includes segmenting the second encrypted data based at least in part on the encrypted second tenant identifier, and where the anonymizing of the second encrypted data preserves relationships among the second data associated with a second tenant identifier. According to one embodiment of this aspect, at least one segment of encrypted anonymized data includes first encrypted data and second encrypted data. According to one embodiment of this aspect, the determining of verification results from the received analysis data includes determining a quantity of times at least one segment of the verification results that correspond to the network data was encrypted. According to one embodiment of this aspect, the second cryptographic key is transmitted.

According to another aspect of the disclosure, a node for anonymizing network data for analysis by another node is provided. The node includes an encryption module configured to encrypt first network data including a first tenant identifier using a first cryptographic key to generate first encrypted data. The node includes an anonymization module configured to anonymize the first encrypted data to generate anonymized data where the anonymizing of the first encrypted data including segmenting the first encrypted data based at least in part on the encrypted first tenant identifier and where the anonymizing of the first encrypted data preserving relationships among the first network data associated with the first tenant identifier. The anonymization module is further configured to encrypt the anonymized data using a second cryptographic key to generate encrypted anonymized data, and transmit the encrypted anonymized data, at least one analysis parameter, at least one security policy and instructions to analyze the encrypted anonymized data using the at least one analysis parameter, the at least one security policy and the second cryptographic key. The node includes a verification module configured to receive analysis data resulting from the analysis of the encrypted anonymized data, and determine verification results from the received analysis data.

According to one embodiment of this aspect, the at least one analysis parameter is a two dimensional matrix where values of the two dimensional matrix indicate a quantity of times to apply a cryptographically based function to a segment of the encrypted anonymized data using the second cryptographic key.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 1 is an example of unencrypted data for two tenants;

FIG. 3 is an example of data encrypted by the cloud provider;

FIG. 4 is an example of segmented log data;

FIG. 5 is an example of encrypted segmented data;

FIG. 6 is an example of EncMatrix and SegLog before permutation;

FIG. 7 is an example of EncMatrix and SegLog after permutation;

FIG. 8 is an example of a first view generated by the analyst;

FIG. 9 is an example of a second view generated by the analyst;

DETAILED DESCRIPTION

Figure 2:
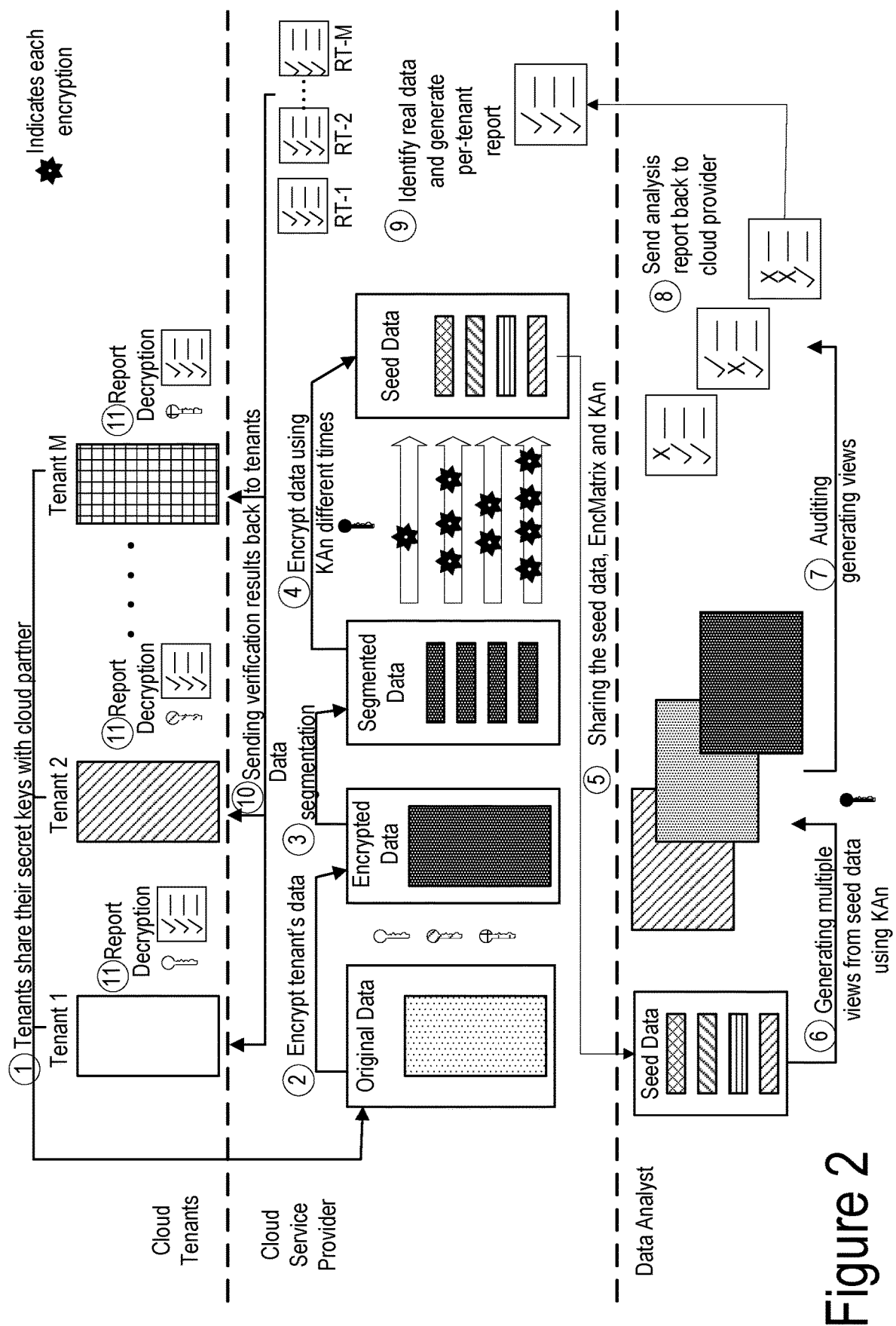
FIG. 2 illustrates an overview of an example embodiment.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In some embodiments, the non-limiting term "network node" is used and it can correspond to any type of radio access node (or radio network node) or any network node, which can communicate with a device such as a user equipment (UE) and/or with another network node in a cellular or mobile or wireless or wired communication system. Examples of network nodes are NodeB, MeNB, SeNB, a network node belonging to MCG or SCG, base station (BS), multi-standard radio (MSR) radio access node such as MSR BS, eNodeB, gNB network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, Self-organizing Network (SON), positioning node (e.g. E-SMLC), MDT, test equipment, etc. Example embodiments of a network node are described in more detail below with respect to FIG. 11.

In some embodiments, the term "radio access technology" (RAT) refers to any RAT e.g. UTRA, E-UTRA, narrow band Internet of things (NB-IoT), WiFi, Bluetooth, next generation RAT (NR), 4G, 5G, etc. Any of the first and the second nodes may be capable of supporting a single or multiple RATs. The term "radio node" used herein can be used to denote a wireless device or a network node.

Conventional techniques for anonymizing network data include truncation, randomization, quantization, and pseudonymization.

Truncation and randomization effectively destroy the semantics of the field they are applied to. One example is the payload of packets, which might contain usernames and passwords, and are removed from the data as standard practice. Quantization techniques, such as limiting the precision of time stamps, are applied to reduce the information gained about the identity of the workstations from timing attacks. Pseudonymization replaces IP addresses found in the data with linkable, prefix-preserving pseudonyms. These pseudonyms preserve the hierarchical relationships found in the prefixes of the original addresses. The underlying goal is to enable the analysis of packets generated from hosts, or whole prefixes, without providing the actual IPs.

Some issues related to data outsourcing and privacy leakage have been addressed by various solutions. Some approaches define a complete frame for information disclosure control through the definition of K-anonymity approach. Others propose L-diversity. Some approaches have proved that k-anonymity and L-diversity do not prevent attribute disclosure, especially when a table has multiple records belong to the same origin or to one individual.

(k,j)-obfuscation was introduced to address the issue of sensitive data obfuscation in network flows by introducing protection guarantees under realistic assumptions about the adversary's knowledge. The problem of privacy preserving quantification of real network reachability across different domains has been addressed by preserving the privacy of access control configuration and access control list's only (layer three devices). Some attempts have been proposed to provide privacy guarantees when sensitive information is stored, processed or outsourced to a second party through data fragmentation and encryption. The idea of this approach is to use make data ambiguous and unintelligible by encrypting it. The loss of information/accuracy and loss of privacy trade-off is treated as a conflict factor in data privacy preserving, which is not accepted if the goal of outsourcing the data is auditing to find and security holes and misconfigurations since any loss in data utility will affect the auditing results so security breaches will not be detected. Other approaches propose a privacy preserving approach for network traces preserving anonymity of IP addresses while preserving utility.

None of the conventional approaches use a privacy preserving cross-tenant auditing system while preserving the privacy of, not only of the data, but also of the topology and relationships in the data (e.g. topology of the virtual infrastructure of the tenants).

As discussed above, it has been alleged that k-anonymity and L-diversity do not prevent attribute disclosure, especially when the table has multiple records belong to the same origin or to one individual. In (k,j)-obfuscation, the data utility and information accuracy remain challenging for them as the outsourced data has been heavily sanitizing each flow into k other flows having the same fingerprint vector. One problem is that work based only on access control lists and routers configuration (layer three) does not cover the virtual switches and virtual machines in the cloud environment and does not preserve the topology of the network that being verified. A drawback of these solutions is that they are splitting the set of attributes in a way they are not visible together and the association among their values is completely unavailable without access the encryption key and retrieving the original version of the data. As such, the analyst will have full access to the data in this case.

An approach based on multiple views has been proposed to cover the tradeoff between data privacy and utility. However, this approach does not take into account tenant identifiers as it only anonymizes IP addresses and consequently do not support privacy-preserving cross-tenant analysis and auditing.

In some embodiments, the tenant ID can be integrated into logs and can be part of the anonymization approach.

Generating multiple views of the same data can include generating only one of these views to correspond to the "real view", while all the other views are "fake views" generated to mislead an adversary about the real one.

In contrast, some embodiments herein propose to split the real data over many or all of the multiple views such that no single view could be used to recover the real information about the audited environment (e.g. the virtual network, tenants, virtual resources). Each view can consist of partially privacy-preserved real information while the rest is unusable information.

By multiplying the number of views containing the partial privacy-preserving information, the security of the approach can be increased, as an attacker would now need to de-anonymize more views and additionally guess the right combination of parts resulting in the complete information.

Accordingly, some embodiments for privacy preserving anonymization of cross-tenant data can include:

Tenant-based encryption: Cloud provider receives a set of keys, where each one is shared with a given tenant and encrypts the data of each tenant with the corresponding key. Note that IP addresses can be encrypted while preserving address prefixes by using, for example, the TCPDPriv algorithm.

Cross-tenants' data segmentation: Cloud provider considers tenants ID to segment the data to preserve the privacy of the tenants' data relationships (e.g. virtual network topology between tenants' virtual machines).

CSP data encryption and utility parameters generation: Cloud provider generates a set of utility parameters (vectors, matrices, and key to be shared with the analyst) and encrypts accordingly the data to be outsourced. Furthermore, part of the utility parameters is to be outsourced for the use of analysis while the other part is kept unshared to recover the correct results.

Cross-tenants third party auditing: Analysis using the received utility parameters to apply the needed transformation of the received privacy-preserved data to generate the multiple views and perform the required analysis.

CSP collecting results and reporting to individual tenants: Cloud provider is the only entity capable of integrating the correct results and sending each tenant the portion of the report related to its data.

Some embodiments described herein preserve the privacy of sensitive attributes in the outsourced data including IP addresses, tenant identifiers and virtual resource identifiers. The relationship between these sensitives attributes can be preserved. For instance, topology-related information in row data would not be leaked to any third party. Privacy related to the analysis results can be preserved both across all tenants but also from any third-party including a third-party analyst. The utility of the outsourced data can also be preserved, which is one of the factors when outsourcing data for auditing. Specifically, any loss in the data would decrease its utility and results in the incorrectness of the verification results.

Unlike conventional solutions, some embodiments move the tradeoff between privacy and utility to a tradeoff between privacy and computation cost. Several types of data can be anonymized, including IP addresses and resources identifiers.

An example cloud computing system can consist of many tenants that are using services introduced by cloud service provider (e.g. storage, computation, infrastructure, etc.). Cloud tenants are worried about the security and privacy of their data and the concern for them highly increased because of the nature of the cloud that allows multiple tenants to share the same physical resources. Particularly, competitors may reside in the same physical machines and use the same resources (e.g. memory and CPU). Tenants want guarantees that their infrastructure is isolated from other tenants' infrastructures, that their rules and configurations are applied and deployed as requested, that their applications are only reached as specified by their policies, etc. If there are misconfigurations or holes, they should be repaired. To do that, a partially trusted third party may be required to perform this operation and check if the cloud provider is following the regulations and not hiding such information which could lead into loosing tenants' confidence.

Cloud providers are typically not willing to disclose their confidential data, configuration, topologies, etc. to a third party without being confident that their data will not be leaked, including any analysis results, so that they cannot be misused by a malicious entity to attack the cloud provider or tenants' assets.

The following assumptions will be made for illustrative purposes:

Tenants trust a third-party analyst entity to audit, verify and analyze their data, but not the cloud service provider.

Tenants do not trust the analyst entity to have access to their confidential information such as private IPs, topologies, etc.

Cloud service provider does not trust the third-party analyst entity to not misuse the data.

Cloud service provider does not trust tenants to not misuse the received analysis results and use it to launch attacks against other tenants.

It is assumed that the data being analyzed is compositionally verifiable, which means that the system uses a divide-and-conquer mechanism of verification. So instead of verifying the whole data in one shot, it is divided into smaller chunks and each chunk is analyzed separately. Analysis results can be combined to produce the same results as if it was analyzed all in one shot.

Privacy-preservation of data is considered that can be log files generated by the cloud infrastructure management system (e.g. openstack) or the network controller (e.g. opendaylight), the related configuration data identified the tenant ID to which belongs the virtual resources, including the security group rules, the security policies, routing rules, etc.

Considering the example of cloud configuration data (e.g. as extracted from nova, neutron and/or ceilometer for example) in FIG. 1, comprising nine columns that represent information about virtual networks and their VMs, including: the tenant identifier, its virtual network identifier, the network private IP range, the VM identifier part of that network, the private and public IPs corresponding to that VM, the virtual router ID connecting the network to other subnets, with its corresponding virtual interface ID and IP. The data can include more information if needed by the analysis such as virtual ports associated with the virtual machines and so on. The topology of a network with many VMs may span several rows. The relationship between the rows thus is also considered as a sensitive attribute as it contains information about the topology of the network.

It is noted that the tenant ID information can be used in a special role. Tenant ID can be used to distinguish between virtual resources. For example, the same set of private network IP addresses can be used for multiple tenants. If the tenant ID is not associated with each row, it then may be impossible to verify the security policies for private network IPs for different tenants as it would be impossible to distinguish between addresses in different tenants' virtual network. For example, assume that private addresses 10.0.0.1 and 10.0.0.2 are used for each of tenant IDs 10, 20, and 60. If tenant 10 asks for 10.0.0.1 to be not reachable by 10.0.0.2, and the tenant IDs are not stored with log rows, it would be impossible to distinguish between 10.0.0.1 used for tenants 10, 20 or 60. Note that this problem is relevant for many cloud management systems. For example, OpenStack use the same private network addresses for all the tenants.

An objective is to preserve the privacy of each single network attribute, the privacy of the topology of these networks, and the privacy of the verification results.

A segment is defined as being a subset of the log data. Thus, in FIG. 1, a segment could be a single row or a set of rows. Thus, the maximum number of segments in FIG. 1 is ten.

For completeness, the analysis of reachability property should be performed between all pairs of elements (VMs) in this dataset. Thus, different segments have to be composed across the views generated by the analysis. A view is defined as a set of processed (and encrypted) segments where only the analysis that comes out of a part of the view would lead to the correct reachability results while the analysis of the remaining part view will lead to fake/incorrect reachability results.

Collecting network traces with tenant IDs

It is noted that some embodiments can be extended to network traffic traces. Conventionally, these traces/logs collected at network nodes are generally are in the form such as:

| Time stamps | Src IP | Src Port | Dst IP | Dst Port | Protocol |
|---|---|---|---|---|---|
| 111212342 | 10.0.1.5 | 1222 | 10.0.1.18 | 80 | tcp |

However, these traces cannot be used as it is in the cloud environment. For example, IP sessions between different VMs are logged, but at the network node level (e.g. physical or virtual switches and routers), these sessions are not augmented by tenant IDs. As cloud provides a multi-tenant environment, the tenants can be provided with several virtual networks. These virtual networks often use the same set of private addresses. Therefore, the virtual addresses traced in the network traces can contain similar virtual IP addresses belonging to different tenants and therefore not submitted to the same security policies. For example, as there are many similar virtual IP addresses used for different tenants therefore the traditional anonymization methods won't work.

Accordingly, some aspects of the anonymization approach can also be used for network traces by adding a tenant ID for each network trace. Mainly, for example in a cloud environment using SDN, e.g., VxLAN based SDN implementation, each virtual network packet would receive tenant ID of the virtual network it belongs too.

Therefore, the new network virtual network trace would become:

| Tenant ID | Time stamps | Src IP | Src Port | Dst IP | Dst Port | Protocol |
|---|---|---|---|---|---|---|
| 1234 | 111212342 | 10.0.1.5 | 1222 | 10.0.1.18 | 80 | tcp |

These traces can then be used for the anonymization approach.

FIG. 2 illustrates an overview of an example embodiment. There are three entities considered for illustrative purposes: the cloud tenant(s), the cloud provider, and the data analyst. It will be appreciated that one or more of the steps illustrated in FIG. 2 can be performed simultaneously and/or in a different order. Also, some steps illustrated in FIG. 2 are optional and can be omitted in some embodiments. It will be appreciated that, in some embodiments, some steps need not be performed by the specific entity (e.g. cloud tenant vs. cloud provider vs. data analyst) as shown in the non-limiting example of FIG. 2.

Encryption can refer to two different types of encryption: identifier(s) for tenants and virtual resources are encrypted using block cipher algorithm and, for IP addresses, encryption algorithms that preserves the addresses prefixes are used not to lose the utility and keep the subnet aspect consistent between the original data and the encrypted data. Further, an initialization vector can be shared when sharing the encryption key to ensure the correctness of the encrypted results.

Step 1: Secret key sharing. Each tenant generates a symmetric encryption key, KT, and an initialization vector to be shared with the cloud provider via a trusted channel.

Step 2: Initial Encryption. Cloud provider collects data from the system and encrypts each piece of auditable data related to tenant Ti using the tenant's key ($K_{Ti}$) provided in the previous step. An example of original data and encrypted data belonging to two different tenants is illustrated in FIG. 1 and FIG. 3, respectively. FIG. 1 illustrates the original unencrypted data belonging to two example tenants—Tenant ID 1234 and Tenant ID 5678.

FIG. 3 illustrates the result of encrypting the data of FIG. 1 using a one-time encryption using $K_{T1}$ and $K_{T2}$, respectively for each tenant. As such, the data associated with Tenant ID 1234 has been encrypted using $K_{T1}$ (e.g. the encrypted Tenant ID becomes 9998), and the data associated with Tenant ID 5678 has been encrypted using $K_{T2}$ (e.g. the encrypted Tenant ID becomes 5554). Each cell can be treated independently so that the IP addresses are prefix-preserved. Note that the Public IPs are not encrypted in this example.

Accordingly, in this example, each row in FIG. 1 that is associated with Tenant ID 1234 is encrypted with the same key, $K_{T1}$. Each row that is associated with Tenant ID 5678 is encrypted with the same key, $K_{T2}$. Similarly, all IP addresses starting with 10.0 (in FIG. 1) are encrypted to become IP addresses starting with 66.22 (in FIG. 3).

Step 3: Data Segmentation. Let S represent the size of the auditable data collected by the cloud provider.

Step 3A: First, the cloud provider selects parameters related to the privacy level. Those parameters can include the number of segments $N_{seg}$ and the total number of views $N_{views}$ to be generated by the analyst function. As all generated views can be verified by the analyst for reachability, the larger the number of views, the costlier would be the analysis. At the same time, the smaller number of views used, the more information could be susceptible to being leaked (e.g. real topology leakage). Therefore, there is a tradeoff in choosing the number of views.

An exemplary method for defining the number of views and segments is considered as follows. If there are two segments per view and $N_{seg}$ segments in total, the number of views would be:

$$Nviews = \frac{Nseg \times (Nseg - 1)}{2}$$

In more general terms, for a given number of segments per view $N_{seg\text{-}view}$, each view corresponds to a (ordered and without a repetition) combination of a set of segments of size $N_{seg\text{-}view}$. Thus, the total number of possible views can be calculated as follows:

$$Nviews = \frac{Nseg!}{N_{seg\text{-}view}! \times (Nseg - N_{seg\text{-}view})!}$$

In the remainder of this non-limiting example, the description will be based on the case where $N_{seg\text{-}view}=2$.

Based on the example of FIG. 3, the size of the log is S=10. If the cloud provider selects 5 as the number of segments, the size of a segment would be:

$$S\_seg = \frac{10}{5} = 2$$

For a number of $N_{seg\text{-}view}=2$, the total number of views to be generated by the analyst is $$\frac{5 \times 4}{2} = 10$$

views.

Step 3B. Given the selected $N_{seg}$ and $N_{views}$ values, the cloud provider first sorts the data based on the tenant ID and network ID. Then, it is parceled into the segments, for example, in a round-robin fashion to ensure that each network will spread out over the segments to minimize the topology leakage in the generated views. In other words, each segment would not contain a single whole network topology. This can increase the privacy by minimizing the portion of real topology in each segment.

It is noted that the example segmentation is based on tenant ID for anonymization. The tenant ID can be actively used for different steps, i.e. data segmentation, interpretation and reporting of the results.

The compositionality property would allow the analysis to be performed on each subset of the data in each view independently of the others. Then, once the analysis is performed on all views, only the cloud provider will have access to the audit results of the whole system while the tenants would only have access to the analysis of the data related to their respective assets.

The output of step 3 is the segmented log data (SegLog) illustrated in FIG. 4. The data in FIG. 4 results from the processing of the data in FIG. 3 as follows: 1) sorting the in FIG. 3 based on the Tenant ID and the Network ID, and 2) distributing the sorted rows amongst the five segments.

Step 4: Outsourced data preparation: EncMatrix calculation and data re-encryption. In this step, the cloud provider generates a set of vectors only known by the cloud provider together with an encryption matrix EncMatrix and an encryption key $K_{An}$ to be shared with the analyst via a trusted channel.

A vector $V_{Random}$ of size ($N_{seg} \times 1$): elements of the vector are random integer values.

A set of vectors $\{VP_i\}_{i \in N_{view}}$, $VP_i$ are of size ($N_{seg} \times 1$). Elements are computed integer values where 2 elements out of $N_{Seg}$ are equal values.

The matrix EncMatrix is of ($N_{seg} \times N_{view}$)

The encryption key $K_{An}$: to be shared by the cloud provider with the analyst via a trusted channel.

These vectors and the matrix guarantee that in each view generated by the analyst using EncMatrix, only the two real segments will be encrypted using the same number of keys so that the reachability analysis over them remains valid while the remaining part of the view would lead to incorrect/fake results. This is meant to hide from the analyst the actual cloud infrastructure (network sensitive attributes and topology) and their reachability results.

The following Algorithm 1 is an example summary of step 4:

```
Algorithm1 OutsourcingPrep ( ){
    1- Generate VRandom
    2- Generate KAn
    3- Encrypt (SegLog,Vrandom,K_An)
    4- GenerateVP( ) \\Generate VP_i
    5- GenerateEncMatrix( ) \\Compute Enc_matrix
    6- EncMatrix_p, SegLog_p = Permute(EncMatrix, SegLog)
    7- return VP_i, KAn, EncMatrix_p, SegLog_p;
} // end Algorithm1
```

The following Algorithm 2 can be used to generate vectors $\{VP_i\}_{i \in N_{view}}$

```
Algorithm2: GenerateVP( ){
    PointerX=2; PointerY=1
    for (int i=1; i<=N_Views; i++){
```

```
            for (int j=0; j<N_seg; j++) {
                random=Rand ( ); //generate random numbers
                If (j+1==PointerX){
                    VPi(pointerY-1)= random;
                }Else{
                    VPij= random;
                }
            }
            if(PointerX<N_seg) {
                k++;
            }Else{
                PointerY++;
                PointerX=PointerY+1;
            }
        }
    } // End of algorithm2
```

The following example Algorithm 3 illustrates how to generate the EncMatrix using $V_{Random}$ and $\{VP_i\}_{i \in N_{view}}$:

```
Algorithm3: GenerateEncMatrix( ){
    For (inti=1; i<=N_views; i++){
        cloumn_i= V_{Pi} - V_{Random}
    }
} // End of algorithm 3
```

The following illustrates this step in more details, including the generated vectors and matrix based on the previous example.

Step 4A: The cloud provider generates a random vector of size equal to the number of partitions. An example of $V_{Random}$ is:

$$V_{Random} = \begin{Bmatrix} RP_1 \\ \vdots \\ RP_{Nseg} \end{Bmatrix} = \begin{Bmatrix} 3 \\ 5 \\ 2 \\ 7 \\ 4 \end{Bmatrix}$$

Step 4B: The cloud provider encrypts each segment of data seg_i the using the $K_{An}$, where each segment would be encrypted using $K_{An} \times V_{random_i}$ ($V_{random_i}=RP_i$) times depending on the index of the segment. For example, Segment #1 will be encrypted 3 times using $K_{An}$.

FIG. 5 illustrates the data encrypted various times based on elements of $V_{Random}$ vector. Based on the $V_{Random}$ provided above, for example, the first two rows of data in FIG. 4 are encrypted using $3 \times K_{An}$. Rows 3 and 4 in FIG. 4 are encrypted using $5 \times K_{An}$. The last two rows are encrypted using $4 \times K_{An}$.

Step 4C: Cloud provider generates the set of vectors $\{VP_i\}_{i \in N_{view}}$.

The number of vectors to be generated is proportional to the number of views. For this example, there will be 10 vectors each of size N_seg=5. Following this example, there are 10 vectors as follows:

$$V_{P1} = \begin{Bmatrix} 12 \\ 12 \\ 13 \\ 17 \\ 14 \end{Bmatrix}; V_{P2} = \begin{Bmatrix} 15 \\ 11 \\ 15 \\ 13 \\ 17 \end{Bmatrix}; V_{P3} = \begin{Bmatrix} 18 \\ 13 \\ 11 \\ 18 \\ 12 \end{Bmatrix}; V_{P4} = \begin{Bmatrix} 16 \\ 14 \\ 15 \\ 17 \\ 16 \end{Bmatrix}; V_{P5} = \begin{Bmatrix} 11 \\ 19 \\ 19 \\ 18 \\ 12 \end{Bmatrix}$$

$$V_{P6} = \begin{Bmatrix} 13 \\ 14 \\ 16 \\ 14 \\ 12 \end{Bmatrix}; V_{P7} = \begin{Bmatrix} 15 \\ 13 \\ 15 \\ 17 \\ 13 \end{Bmatrix}; V_{P8} = \begin{Bmatrix} 11 \\ 13 \\ 18 \\ 18 \\ 12 \end{Bmatrix}; V_{P9} = \begin{Bmatrix} 19 \\ 14 \\ 16 \\ 17 \\ 16 \end{Bmatrix}; V_{P10} = \begin{Bmatrix} 11 \\ 20 \\ 12 \\ 19 \\ 19 \end{Bmatrix}$$

Step 4D: Encryption matrix (EncMatrix) generation. The data owner now generates $N_{seg} \times N_{view}$. Where the matrix elements are the number of times the analyst needs to apply the key $K_{An}$ on each segment.

Algorithm 2 generates the following encryption matrix:

$$EncMatrix = \begin{Bmatrix} 9 & 12 & 15 & 13 & 8 & 10 & 12 & 8 & 16 & 8 \\ 7 & 6 & 8 & 9 & 14 & 9 & 8 & 8 & 9 & 15 \\ 11 & 13 & 9 & 13 & 17 & 14 & 13 & 16 & 14 & 10 \\ 10 & 6 & 11 & 10 & 11 & 7 & 10 & 11 & 10 & 12 \\ 10 & 13 & 8 & 12 & 8 & 8 & 9 & 8 & 12 & 15 \end{Bmatrix}$$

Step 4E: Pairing and permutation of EncMatrix and Seed View. The cloud provider can perform a random permutation of the encryption matrix and the segments to hide which pair of segments are being verified at each generated view. Each row in the EncMatrix is paired with its corresponding partition and randomly permuted (horizontal permutation to prevent analyst from knowing which pairs of the partitioned log are being verified at each view). Pairing means that each row in the EncMatrix is linked to its corresponding segment in the encrypted data and permuted together. The following figures illustrate both EncMatrix and Seed view before and after permutation.

FIG. 6 illustrates the encrypted segmented data, which will be referred to as "seed view" (this is the same as in FIG. 5) and the generated encryption matrix EncMatrix. Each row in EncMatrix is paired with the rows in the corresponding segment in the seed view. For example, the first row in EncMatrix is paired with the two first rows in the seed view (which constitute together the first segment). The second row in the EncMatrix is paired with the third and fourth rows of the seed view (which constitute together the second segment), and so on.

FIG. 7 illustrates EncMatrix and SegLog after permutation. The data of FIG. 7 is obtained by permutating, at the same time, the rows of the EncMatrix and the seed view while preserving the correspondence between them. For example, the first row of the EncMatrix in FIG. 6 and the paired segment (rows #1 and #2 of the seed view) are moved together to the bottom of the EncMatrix and the seed view, respectively. More specifically, the correspondence between the row index in EncMatrix and the segment index in the seed view is maintained while performing this permutation to "hide" which pair of segments are being verified at each view that will be generated by the analyst.

Step 5: Outsourcing. The cloud provider sends the EncMatrix_p and the SegLog_p, the permutated matrix and seed view of FIG. 7, to the analyst function for analysis.

It is noted that the security policy for each tenant must be encrypted exactly the same way as the data logs. This is necessary as the analyst must perform the security properties verification based on the tenant ID. For example, to verify the network reachability between two private IP addresses, the tenant IDs are considered for the network security verification. For example, if the tenant ID 20 security requirements defines IP 10.0.0.1 must not be reachable from 10.0.0.2, then the auditor must consider the encrypted versions of tenant ID 20, 10.0.0.1 and 10.0.0.2 for verification.

Step 6: Generating Multiple Views. The data analyst can clone the received log SegLog_p into $N_{views}$ (corresponding to the number of columns of EncMatrix_p) copies. Then, the data analyst can divide each copy of the log SegLog_p into $N_{seg}$ (number of rows of the EncMatrix) parts. In this example, 10 copies of the log are needed.

Encryption key $K_{An}$ is used to encrypt (in parallel) each row of each log copy as many times as the corresponding value in the encryption matrix cell. Specifically, for this example, the first row of the first log copy of the SegLog_p is encrypted using EncMatrix_p(1,1) times the key $K_{An}$. Thus, the first view is encrypted using EncMatrix_p(m,1) times the key $K_{An}$ and the second view is encrypted using EncMatrix_p(m,2) times the key $K_{An}$. Finally, the last view (#10) is encrypted using EncMatrix_p(m,10) times the key $K_{An}$.

The following figures illustrate the first two first views generated by the analyst. As previously described, in each view, only part of it contains real information. The rest of the data in the view is fake/incorrect data generated in purpose to hide from the analyst what the actual data and audit results are.

FIG. 8 illustrates the first view generated by the analyst from the first copy of the seed log SegLog_p based on the first column vector in matrix EncMatrix_p. In the table of FIG. 8, rows 5 and 6 (part of segment 3) and rows 9 and 10 (part of segment 5) are the only real data in this view. These rows can only be identified by the cloud provider as will be explained.

FIG. 9 illustrates the second view generated by the analyst from the second copy of the seed log SegLog_p based on the second column vector in EncMatrix_p. In the table of FIG. 9, rows 1 and 2 (part of segment 1) and rows 9 and 10 (part of segment 5) are the only real data in this view. These rows can only be identified by the cloud provider as will be explained.

Step 7: Data analysis. The analyst starts analyzing the generated views for reachability and sends the analysis reports back to cloud providers while keeping the report ID correspond to the corresponding view id (or column id in the EncMatrix_p).

The reachability results for each view would contain all pairs of tuples (Network IP, VMIP, Interface IP) in the view and their reachability results (reachable/not reachable).

It is noted that the security policy for each tenant is encrypted exactly the same way as the data logs. The analyst performs the security properties verification on the encrypted data and based on the tenant ID. For example, to verify the network reachability between two private IP addresses the tenant IDs are considered for the network security verification. For example, if the tenant ID 20 security requirements defines IP 10.0.0.1 must not be reachable from 10.0.0.2, then the auditor must consider the encrypted versions of tenant ID 20, 10.0.0.1 and 10.0.0.2 for verification.

Step 8: Transmit the analysis report(s) back to the cloud provider.

Step 9: Report generation.

Step 9A: Report Integration parameters. The cloud provider can prepare for the report integration to be able to restore back the network data information and their reachability results from analyst reports. To this end, the cloud provider needs to be able to recover which results in the report are the correct ones and which ones are the fake ones.

Thus, based on the report ID (corresponding to the view ID), the cloud provider recovers the $VP_i$ of this view and then recovers the number of times the key was applied for that view. This corresponds to the repeated entry in the vector VP_id.

The positions of these values can be used to recover segments in the seed log file (e.g. from Step 4). Then based on the recovered segments, the key $K_{An}$ and the value of number of times the key must be applied, the cloud provider encrypts the corresponding tuples (Network IP, VM IP, Interface IP).

The cloud provider can then save, for each view, the following elements: the report ID, the number of times the encryption key $K_{An}$ must be used for decryption, all encrypted tuples corresponding to the elements with the correct results in that report.

Step 9B: Report Reception and Integration. Once the cloud provider receives the reports from the analyst and, since the cloud provider already has the encrypted tuples values from Step 8A, thus looking at these values in the report to recover the correct results and discard the others. Once the results are identified for a given tuple, the cloud provider can decrypt the valid elements of the reports to be integrated in the final report.

Step 10: Result Reporting. After integrating the analysis report for each tenant, and to avoid any leak of reachability results, the cloud provider can forward the encrypted report to its owner. Analysis results can be sent only to the concerned parties based on the tenants' ID so that information is not disclosed to unrelated parties.

Step 11: Report decryption. Each tenant can decrypt the report using his shared key with the cloud provider $K_{Ti}$ and observe if he has any reachability breaches or any security threats based on the results. The benefit of using different encryption keys for each tenant and tenant ID is that each tenant would only have access to the clear text of his network elements and the results that are part of his virtual cloud infrastructure. Specifically, the tenant would only intelligibly recognize his resources identifier while any other resource in the report with whom he has a breach in the report would not be available for him in clear as their identifiers/IP are still encrypted with other tenants' keys.

In summary, FIG. 2 and the related data processing illustrated in FIGS. 3-9, describe an embodiment where each tenant shares their key (step 1) with the cloud provider, who encrypts the tenant data (step 2) using their respective supplied key(s). Tenant data is encrypted to preserve the privacy of the data of each tenant from the auditor as well as from the other tenants. The cloud provider aggregates all tenant data, distributes it into segments (step 3) and encrypts each segment again using a key shared with the data auditor according to some generated parameters (step 4). This mechanism provides for hiding the relationships between the data attributes for each tenant from the auditor and guarantees its utility preservation so that the whole data can be analyzed. The output of the latter step is referred to as the seed log.

Once the auditor receives the seed log (step 5), multiple views are generated (step 6) such that each view includes some real segments mixed with other fake segments. This provides for hiding the real relationship of the original data among these views and prevents the auditor from obtaining the real audit results. Then, the auditor can audit all views (step 7) and send the audit report(s) to the cloud provider for each view (step 8).

After receiving the report(s), the cloud provider identifies the real audit results from each report (step 9) and can generate a per-tenant report. This provides for preserving the utility of the audit results and prevents it from reaching non-authorized tenants. Finally, each tenant receives its analysis report (step 10) such that its infrastructure information will be encrypted using its own key, while other tenant information will be encrypted using their own keys, to provide cross-tenant privacy preservation.

Accordingly, some embodiments provide an anonymization approach that allows for a semi-trusted data analyst to analyze/audit a multi-tenant environment (e.g. cloud) while preserving the privacy of tenants' identity and their data. Accidental leakage of logs or audit results from the analyst side are thus avoided.

The anonymization system can be based on the tenant ID. This is necessary to be able to distinguish between different virtual resources and data of different tenants in the outsourced logs and security policies. As discussed, different tenants can have the exact same IP addresses, therefore an anonymization without Tenant IDs cannot be used to distinguish between different networks from different tenants. It thus ensures the correctness and the privacy of the analysis results.

Some embodiments provide a data segmentation system that enables the full analysis of the data while minimizing the privacy leakage. This approach supports the anonymization of several types of data including tenant identifiers and virtual resources identifiers, IP addresses, security policies. Additionally, it preserves the utility of these entities by preserving their relationships. For instance, considering prefix-preserving algorithm to encrypt the IPs and a different algorithm for identifiers.

Some embodiments provide a multiple view generation system such no single view contains all the real data. The network information is spread out over multiple views to minimize the potential topology leakage per view. This approach can preserve the privacy and confidentiality of the real data and the real results from the analyst or any other entity that comes into the possession of the exchanged elements (e.g. seed log, matrices and keys) or the generated views by increasing the difficulty of recovering the whole topology and results from a single view and hiding the real data in each view. Only the cloud provider has access to the correct analysis results of the entire infrastructure.

Figure 10:
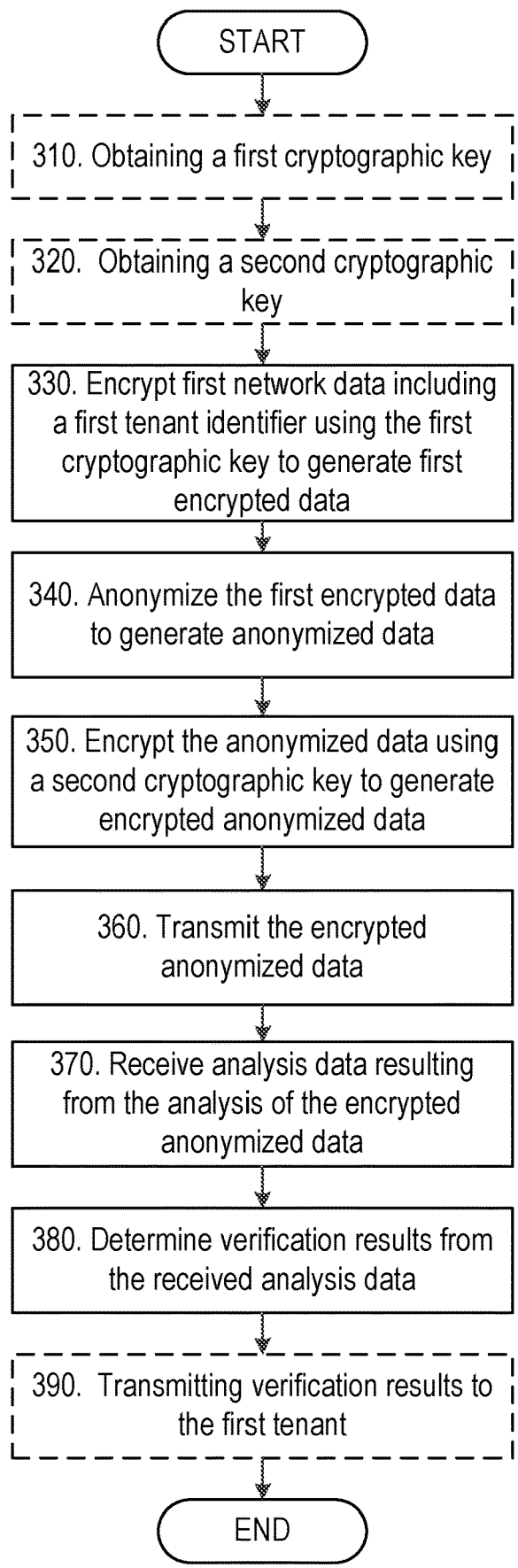
FIG. 10 is a flow chart illustrating an example method performed in a network node.

FIG. 10 is a flow chart illustrating a method which can be performed by a network node, such as a verification device located in a cloud provider. In one or more embodiments, a shared encryption key may be referred to as a cryptographic key. The method can include:

Step 310 (optional): Obtaining a first shared encryption key. In some embodiments, a first cryptographic key is obtained. The first shared key is associated with, and can be received from, a first tenant. In some embodiments, a plurality of first keys can be obtained, each of the first keys being uniquely associated with one of a plurality of tenants.

Step 320 (optional): Obtaining a second shared encryption key. In some embodiments, a second cryptographic key is obtained. The second shared key is associated with, and can be received from, a data analyst entity or function.

Step 330: Encrypting the data, i.e., network/tenant data, associated with the first tenant using the first shared key. In one or more embodiments, first network data including a first tenant identifier is encrypted using a first cryptographic key to generate first encrypted data. Tenant data can include network topology information such as tenant IDs, network IDs, IP addresses and interface IDs. In some embodiments, data associated with a plurality of tenants is encrypted. The data associated with each of the plurality of tenants is encrypting using its respective first shared key (e.g. a different/unique key is used for each tenant).

Step 340: Anonymizing the encrypted data. In some embodiments, anonymizing includes segmentation of the data as has been described herein. In some embodiments, the first encrypted data is anonymized to generated anonymized data. In some embodiments, the anonymizing of the first encrypted data includes segmenting the first encrypted data based at least in part on the encrypted first tenant identifier where the anonymizing of the first encrypted data preserves relationships among the first network data associated with the first tenant identifier. Segmenting the data can include distributing the data associated with a particular tenant ID and/or network ID amongst a number of different segments. The number of segments to be used can be determined in accordance with privacy level parameters. In some embodiments, the number of segments can be determined in accordance with the size of the auditable data collected by the cloud provider. In some embodiments, anonymization can include sorting the data based on tenant ID and/or network ID and/or other parameters in order to "spread" data associated with a particular network ID over the maximum number of segments possible.

Step 350: Encrypting the anonymized data using the second shared key. In some embodiments, the anonymized data is encrypted using a cryptographic key such as a second cryptographic key to generate encrypted anonymized data. In some embodiments, each segment of the anonymized data is encrypted independently from (e.g. differently) the other segments. For example, each segment can be encrypted a number of times using the second shared key. A first segment can be encrypted a first number of times, while a second segment can be encrypted a second number of times, and so on. The number of times a segment is encrypted using the second key can be determined randomly. In other embodiments, the number of times a segment is encrypted using the second key can be determined in accordance with one or more parameters associated with the segment.

In some embodiments, the encrypted data can be further randomized/anonymized by permutated the encrypted segments.

Step 360: Transmitting the encrypted anonymized data to the data analyst. In some embodiments, the network node can also indicate to the data analyst a number of views to be generated. Each view can include a combination of real data and fake data to be analyzed.

In some embodiments, the network node can further transmit one or more parameters (for example, a matrix having a size equal to the number of segments multiplied by the number of views) to indicate to the data analyst the number of times the anonymized data should be encrypted each time to obtain each view. As has been described above, this can be used to instruct the data analyst with respect to the number of times to clone the anonymized data (e.g. based on the number of columns of the matrix). Then, each clone can be encrypted with a column of the matrix and the second key such that each segment i in the view j is encrypted with the second key as many times as the corresponding value (i,j) in the matrix. For example, in some embodiments, the encrypted anonymized data, at least one analysis parameter, at least one security policy and instructions to analyze the encrypted anonymized data using the at least one analysis parameter, the at least one security policy and the second cryptographic key, are transmitted.

Step 370: Receiving analysis data from the data analyst. In some embodiments, analysis data resulting from the analysis of the encrypted anonymized data is received. In some embodiments, the analysis data includes a combination of verification results for real data and fake data.

Step 380: Determining verification results from the received analysis data. In some embodiments, this can include reconstructing or recovering real verification results from a combination of real and fake data. In some embodiments, this can include recovering the segments and the number of times the second key was used to encrypt each segment. The network node can extract the correct verification results from the received analysis data and discard the remaining data.

Step 390 (optional): Transmitting verification results associated with the first tenant to the first tenant. In some embodiments, the network node can report the verification results on a per tenant basis in accordance with the tenant ID. The tenant report can be encrypted by the first shared key.

According to one or more embodiments, the at least one analysis parameter is a two dimensional matrix where values of the two dimensional matrix indicate a quantity of times to apply a cryptographically based function to a segment of the encrypted anonymized data using the second cryptographic key. According to one embodiment of this aspect, a quantity of columns in the two dimensional matrix indicates a quantity of copies of the encrypted anonymized data to generate. The instructions to analyze the encrypted anonymized data include instructions to generate a plurality of data views where each data view correspond to an application of a respective column of the two dimensional matrix to a respective copy of the encrypted anonymized data. According to one embodiment of this aspect, each data view includes a portion that preserves relationships among the first network data associated with a first tenant identifier, and a portion that fails to preserve relationships among the first network data associated with a first tenant identifier.

According to one embodiment of this aspect, a quantity of rows in the two dimensional matrix correspond to a quantity of segments in the encrypted anonymized data. According to one embodiment of this aspect, the anonymizing of the first encrypted data includes pairing each row of the two dimensional matrix with a respective segment of the first encrypted data, and modifying an ordering of rows of the two dimensional matrix and corresponding segments of the first encrypted data. According to one embodiment of this aspect, the processing circuitry is further configured to: encrypt second data including a second tenant identifier using the second cryptographic key to generate second encrypted data, and anonymize the second encrypted data to generate a portion of the anonymized data where the anonymizing of the second encrypted data including segmenting the second encrypted data based at least in part on the encrypted second tenant identifier and where the anonymizing of the second encrypted data preserving relationships among the second data associated with a second tenant identifier.

According to one embodiment of this aspect, at least one segment of encrypted anonymized data includes first encrypted data and second encrypted data. According to one embodiment of this aspect, the determining of verification results from the received analysis data includes determining a quantity of times at least one segment of the verification results that correspond to the network data was encrypted. According to one embodiment of this aspect, the processing circuitry is further configured to transmits the second cryptographic key.

It will be appreciated that one or more of the above steps can be performed simultaneously and/or in a different order. Also, steps illustrated in dashed lines are optional and can be omitted in some embodiments.

Figure 11:
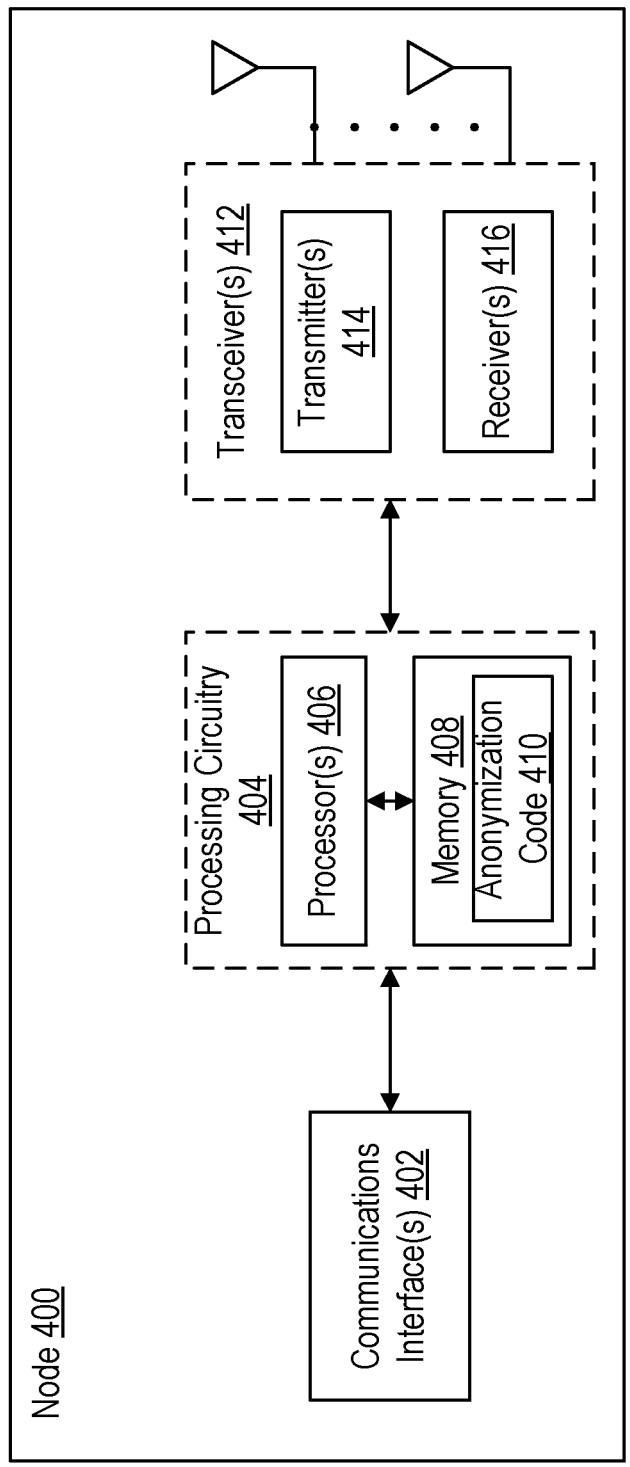
FIG. 11 is a block diagram of an example network node.

FIG. 11 is a block diagram of an exemplary network node 400, in accordance with certain embodiments. Network node 400 may include one or more of a transceiver 412, processor 406, memory 408, and network/communication interface 402. In some embodiments, the transceiver 412 facilitates transmitting wired/wireless signals to and receiving wired/wireless signals from other nodes or entities (e.g., via transmitter(s) (Tx) 414, receiver(s) 416 (Rx), and antenna(s)). The processor 406 executes instructions to provide some or all of the functionalities described above as being provided by a network node 400, the memory 408 stores the instructions executed by the processor 406. In some embodiments, the processor 406 and the memory 408 form processing circuitry 404. The communication interface 402 communicates signals to backend network components, such as a gateway, switch, router, Internet, Public Switched Telephone Network (PSTN), core network nodes or radio network controllers, etc.

The processor 406 may include any suitable combination of hardware to execute instructions and manipulate data to perform some or all of the described functions of network node 400, such as those described above. In some embodiments, the processor 406 may include, for example, one or more computers, one or more central processing units (CPUs), one or more microprocessors, one or more application specific integrated circuits (ASICs), one or more field programmable gate arrays (FPGAs) and/or other logic.

The memory 408 is generally operable to store instructions, such as a computer program, software, an application including one or more of logic, rules, algorithms, code, tables, etc. and/or other instructions capable of being executed by a processor. Examples of memory 408 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. In one or more embodiments, memory 408 stores anonymization code 410. For example, anonymization code 410 includes instructions that, when executed by processor 406, causes processor 406 to perform the one or more processes discussed herein with respect to a network node such as the process of FIG. 10.

In some embodiments, the communication interface 402 is communicatively coupled to the processor 406 and may refer to any suitable device operable to receive input for network node 400, send output from network node 400, perform suitable processing of the input or output or both, communicate to other devices, or any combination of the preceding. The communication interface 402 may include appropriate hardware (e.g., port, modem, network interface card, etc.) and software, including protocol conversion and data processing capabilities, to communicate through a network.

Other embodiments of network node 400 may include additional components beyond those shown in FIG. 11 that may be responsible for providing certain aspects of the network node's functionalities, including any of the functionalities described above and/or any additional functionalities (including any functionality necessary to support the solutions described above). The various different types of network nodes may include components having the same physical hardware but configured (e.g., via programming) to support different radio access technologies, or may represent partly or entirely different physical components.

In some embodiments, the network node 400, which can be, for example, a verification device located in a cloud provider, may comprise a series of modules configured to implement the functionalities of the network node 400 described above.

It will be appreciated that the various modules may be implemented as combination of hardware and software, for instance, the processor 406, memory 408 and transceiver(s) 412 of network node 400 shown in FIG. 11. Some embodiments may also include additional modules to support additional and/or optional functionalities.

Figure 12:
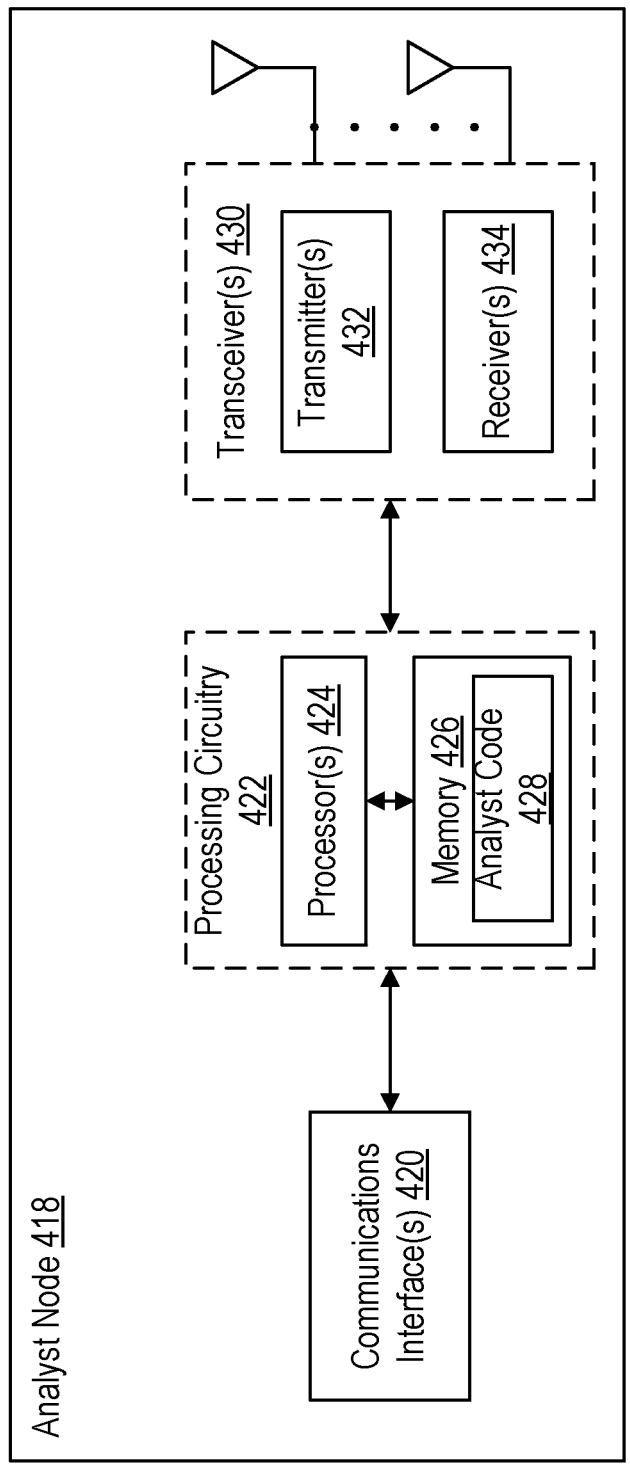
FIG. 12 is a block diagram of an example analyst node.

FIG. 12 is a block diagram of an exemplary analyst node 418, in accordance with certain embodiments. analyst node 418 may include one or more of a transceiver 430, processor 424, memory 426, and network/communication interface 420. In some embodiments, the transceiver 430 facilitates transmitting wired/wireless signals to and receiving wired/wireless signals from other nodes or entities (e.g., via transmitter(s) (Tx) 432, receiver(s) (Rx) 434, and antenna(s)). The processor 424 executes instructions to provide some or all of the functionalities described above as being provided by a analyst node 418, the memory 426 stores the instructions executed by the processor 424. In some embodiments, the processor 424 and the memory 426 form processing circuitry 422. The communication interface 420 communicates signals to backend network components, such as a gateway, switch, router, Internet, Public Switched Telephone Network (PSTN), core network nodes or radio network controllers, etc.

The processor 424 may include any suitable combination of hardware to execute instructions and manipulate data to perform some or all of the described functions of analyst node 418, such as those described herein. In some embodiments, the processor 424 may include, for example, one or more computers, one or more central processing units (CPUs), one or more microprocessors, one or more application specific integrated circuits (ASICs), one or more field programmable gate arrays (FPGAs) and/or other logic.

The memory 426 is generally operable to store instructions, such as a computer program, software, an application including one or more of logic, rules, algorithms, code, tables, etc. and/or other instructions capable of being executed by a processor. Examples of memory 426 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information. In one or more embodiments, memory 426 stores analyst code 428. For example, analyst code 428 includes instructions that, when executed by processor 424, causes processor 424 to perform the one or more processes discussed herein with respect to a analyst node 418 such as the process of FIG. 13.

In some embodiments, the communication interface 420 is communicatively coupled to the processor 424 and may refer to any suitable device operable to receive input for analyst node 418, send output from analyst node 418, perform suitable processing of the input or output or both, communicate to other devices, or any combination of the preceding. The communication interface 420 may include appropriate hardware (e.g., port, modem, network interface card, etc.) and software, including protocol conversion and data processing capabilities, to communicate through a network.

Other embodiments of analyst node 418 may include additional components beyond those shown in FIG. 12 that may be responsible for providing certain aspects of the analyst node's functionalities, including any of the functionalities described above and/or any additional functionalities (including any functionality necessary to support the solutions described above). The various different types of analyst nodes 418 may include components having the same physical hardware but configured (e.g., via programming) to support different radio access technologies, or may represent partly or entirely different physical components.

In some embodiments, the analyst node 418, which can be, for example, a device located in a cloud provider, may comprise a series of modules configured to implement the functionalities of the analyst node 418 described herein.

It will be appreciated that the various modules may be implemented as combination of hardware and software, for instance, the processor 424, memory 426 and transceiver(s) 430 of network node 400 shown in FIG. 12. Some embodiments may also include additional modules to support additional and/or optional functionalities.

Figure 13:
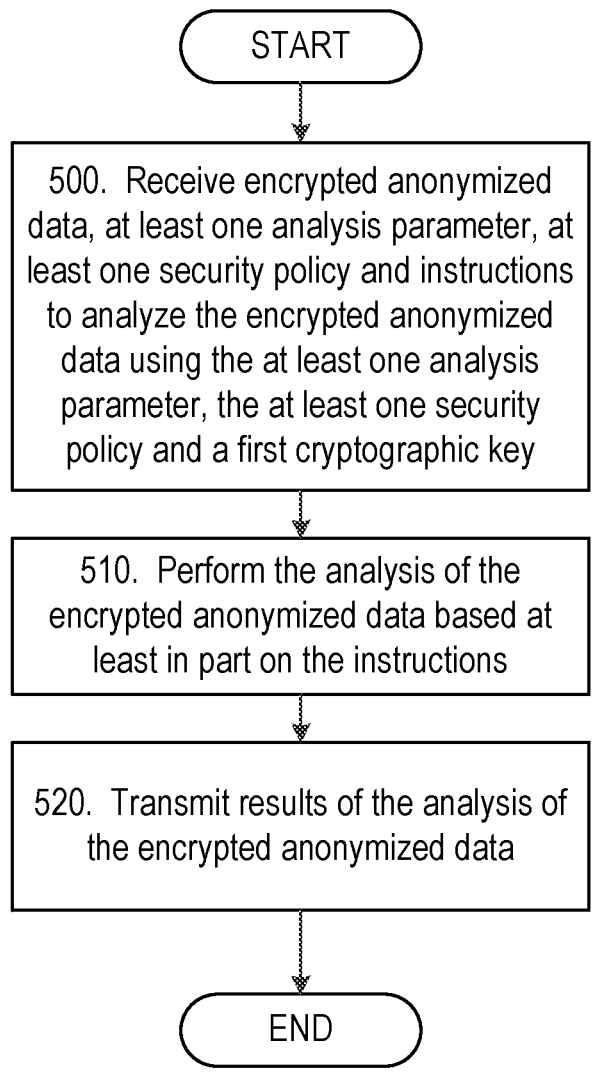
FIG. 13 is a flow chart illustrating an example method performed in the analyst node.

FIG. 13 is a flow chart illustrating a method which can be performed by an analyst node 418, such as a device located in a cloud provider. The method can include:

Step 500: receive encrypted anonymized data, at least one analysis parameter, at least one security policy and instructions to analyze the encrypted anonymized data using the at least one analysis parameter, the at least one security policy and a first cryptographic key;

Step 510: perform the analysis of the encrypted anonymized data based at least in part on the instructions. In one or more embodiments, the analysis may include generating a plurality of data views based at least in part on the encrypted anonymized data where each data view may include a portion that preserves relationships among the first network data associated with a first tenant identifier and a portion that fails to preserve relationships among the first network data associated with the first tenant identifier.

Step 520: transmit results of the analysis of the encrypted anonymized data.

According to one or more embodiments, the encrypted anonymized data is based at least in part on: encryption of first network data including the first tenant identifier using second cryptographic key to generate first encrypted data; and anonymizing of the first encrypted data to generate anonymized data. The anonymizing of the first encrypted data includes segmenting the first encrypted data based at least in part on the encrypted first tenant identifier. The anonymizing of the first encrypted data preserves relationships among the first network data associated with the first tenant identifier. The encrypted anonymized data is based at least in part on encryption of the anonymized data using the first cryptographic key to generate the encrypted anonymized data. According to one or more embodiments, the at least one analysis parameter is a two dimensional matrix where values of the two dimensional matrix indicate a quantity of times to apply a cryptographically based function to a segment of the encrypted anonymized data using the first cryptographic key.

According to one or more embodiments, a quantity of columns in the two dimensional matrix indicate a quantity of copies of the encrypted anonymized data to generate. Each data view corresponds to an application of a respective column of the two dimensional matrix to a respective copy of the encrypted anonymized data. According to one or more embodiments, a quantity of rows in the two dimensional matrix correspond to a quantity of segments in the encrypted anonymized data. According to one or more embodiments, the encrypted anonymized data is further based at least in part on: encrypting second data including a second tenant identifier using a third cryptographic key to generate second encrypted data, and anonymizing of the second encrypted data to generate a portion of the anonymized data. The anonymizing of the second encrypted data includes segmenting the second encrypted data based at least in part on the encrypted second tenant identifier. The anonymizing of the second encrypted data preserves relationships among the second data associated with the second tenant identifier. According to one or more embodiments, each data view includes a portion that preserves relationships among the second data associated with the second tenant identifier, and a portion that fails to preserve relationships among the second data associated with the second tenant identifier.

Figure 14:
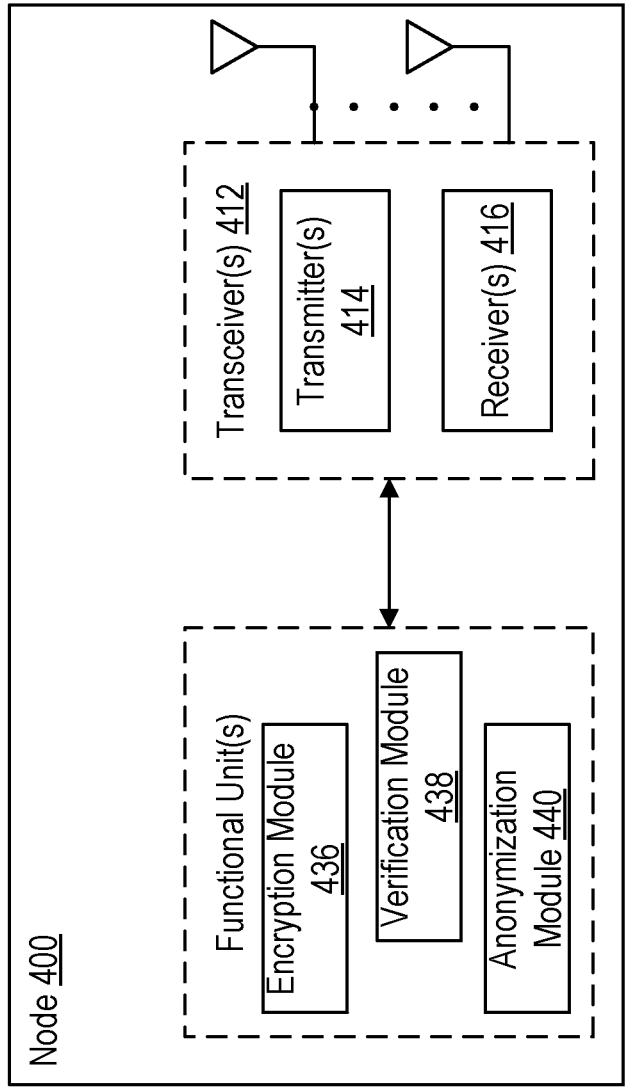
FIG. 14 is a block diagram of an example network node with modules.

Referring to FIG. 14, in some embodiments, the network node can comprise an encryption module 436 for encrypting data, an anonymization module 440 for anonymizing data, and a verification module 438 for determining verification results from analysis/auditor data, for performing one or more functions as described herein. For example, in one or more embodiments, the encryption module 436 is configured to encrypt first network data including a first tenant identifier using a first cryptographic key to generate first encrypted data. In one or more embodiments, the anonymization module 440 is configured to anonymize the first encrypted data to generate anonymized data where the anonymizing of the first encrypted data including segmenting the first encrypted data based at least in part on the encrypted first tenant identifier and where the anonymizing of the first encrypted data preserving relationships among the first network data associated with the first tenant identifier. In one or more embodiments, the anonymization module 440 is configured to encrypt the anonymized data using a second cryptographic key to generate encrypted anonymized data and transmit the encrypted anonymized data, at least one analysis parameter, at least one security policy and instructions to analyze the encrypted anonymized data using the at least one analysis parameter, the at least one security policy and the second cryptographic key. In one or more embodiments, the verification module 438 configured to receive analysis data resulting from the analysis of the encrypted anonymized data, and determine verification results from the received analysis data.

Figure 15:
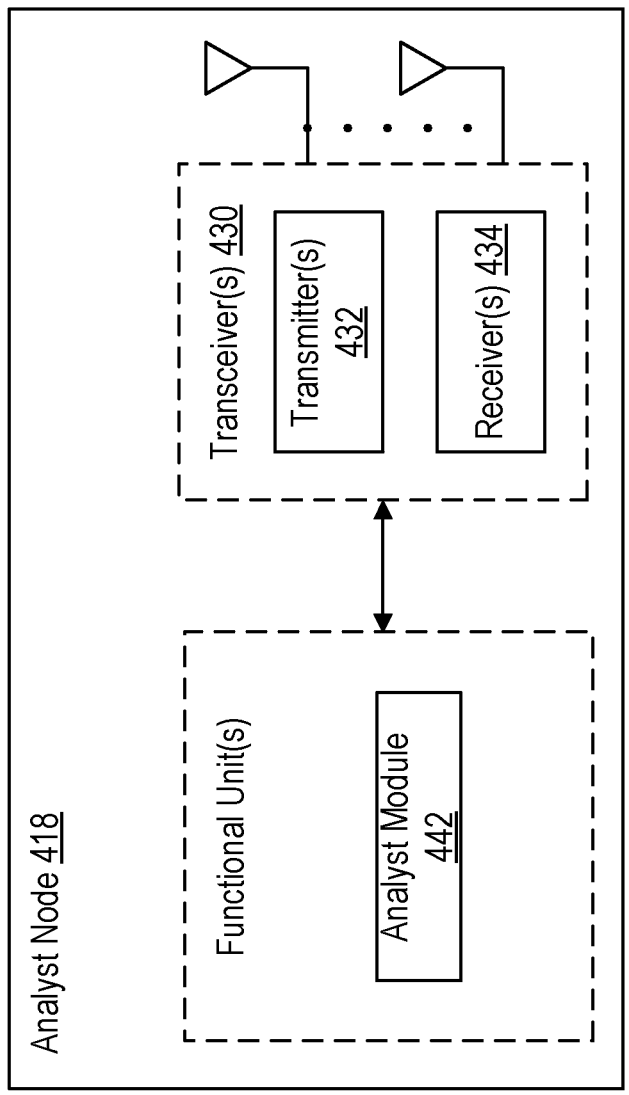
FIG. 15 is a block diagram of an example analyst node with module(s).

Referring to FIG. 15, in some embodiments, the analyst node 418 can comprise an analyst module 442 for encrypting data for analyzing encrypted anonymized data, as described herein such as with respect to FIG. 13.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause processing circuitry (e.g. a processor) to perform steps in a method according to one or more embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

Glossary

The present description may comprise one or more of the following abbreviation:
1×RTT CDMA2000 1× Radio Transmission Technology
5G Fifth Generation
AP Access point
BS Base Station
BSC Base station controller
BTS Base transceiver station
DAS Distributed antenna system
eNB E-UTRAN NodeB or evolved NodeB
E-SMLC evolved Serving Mobile Location Center
E-UTRA Evolved UTRA
E-UTRAN Evolved UTRAN
gNB 5G radio base station
MCG Master cell group
MDT Minimization of Drive Tests
MeNB Master eNode B
MME Mobility Management Entity
MSC Mobile Switching Center
MSR Multi-standard Radio
NR New Radio
O&M Operation and Maintenance
OSS Operations Support System
RA Random Access
RAN Radio Access Network
RAT Radio Access Technology
RNC Radio Network Controller
RRH Remote Radio Head
RRU Remote Radio Unit
SCG Secondary Cell Group
SON Self-organizing Network
SR Scheduling Request
SRS Sounding Reference Signal
TA Timing Advance
TAG Timing Advance Group
Tx Transmitter
UE User Equipment
UTRA Universal Terrestrial Radio Access
UTRAN Universal Terrestrial Radio Access Network

What is claimed is:

1. A node for anonymizing network data for analysis by another node, the node comprising:
processing circuitry configured to:
encrypt first network data including a first tenant identifier using a first cryptographic key to generate first encrypted data;
anonymize the first encrypted data to generate anonymized data, the anonymizing of the first encrypted data including segmenting the first encrypted data based at least in part on the encrypted first tenant identifier, the anonymizing of the first encrypted data preserving relationships among the first network data associated with the first tenant identifier;
encrypt the anonymized data using a second cryptographic key to generate encrypted anonymized data;

transmit the encrypted anonymized data, at least one analysis parameter, at least one security policy and instructions to analyze the encrypted anonymized data using the at least one analysis parameter, the at least one security policy and the second cryptographic key;

receive analysis data resulting from the analysis of the encrypted anonymized data; and determine verification results from the received analysis data.

2. The node of claim 1, wherein the at least one analysis parameter is a two dimensional matrix where values of the two dimensional matrix indicate a quantity of times to apply a cryptographically based function to a segment of the encrypted anonymized data using the second cryptographic key.

3. The node of claim 2, wherein a quantity of columns in the two dimensional matrix indicates a quantity of copies of the encrypted anonymized data to generate; and the instructions to analyze the encrypted anonymized data includes instructions to generate a plurality of data views, each data view corresponding to an application of a respective column of the two dimensional matrix to a respective copy of the encrypted anonymized data.

4. The node of claim 3, wherein each data view includes:

a portion that preserves relationships among the first network data associated with a first tenant identifier; and a portion that fails to preserve relationships among the first network data associated with a first tenant identifier.

5. The node of claim 2, wherein a quantity of rows in the two dimensional matrix correspond to a quantity of segments in the encrypted anonymized data.

6. The node of claim 2, wherein the anonymizing of the first encrypted data includes:

pairing each row of the two dimensional matrix with a respective segment of the first encrypted data; and modifying an ordering of rows of the two dimensional matrix and corresponding segments of the first encrypted data.

7. The node of claim 1, wherein the processing circuitry is further configured to:

encrypt second data including a second tenant identifier using the second cryptographic key to generate second encrypted data; and anonymize the second encrypted data to generate a portion of the anonymized data, the anonymizing of the second encrypted data including segmenting the second encrypted data based at least in part on the encrypted second tenant identifier, the anonymizing of the second encrypted data preserving relationships among the second data associated with a second tenant identifier.

8. The node of claim 7, wherein at least one segment of encrypted anonymized data includes first encrypted data and second encrypted data.

9. The node of claim 1, wherein the determining of verification results from the received analysis data includes determining a quantity of times at least one segment of the verification results that correspond to the network data was encrypted.

10. The node of claim 1, wherein the processing circuitry is further configured to transmits the second cryptographic key.

11. A method for anonymizing network data for analysis by another node, the method comprising:

encrypting first network data including a first tenant identifier using a first cryptographic key to generate first encrypted data;

anonymizing the first encrypted data to generate anonymized data, the anonymizing of the first encrypted data including segmenting the first encrypted data based at least in part on the encrypted first tenant identifier, the anonymizing of the first encrypted data preserving relationships among the first network data associated with the first tenant identifier;

encrypting the anonymized data using a second cryptographic key to generate encrypted anonymized data;

transmitting the encrypted anonymized data, at least one analysis parameter, at least one security policy and instructions to analyze the encrypted anonymized data using the at least one analysis parameter, the at least one security policy and the second cryptographic key;

receiving analysis data resulting from the analysis of the encrypted anonymized data; and determining verification results from the received analysis data.

12. The method of claim 11, wherein the at least one analysis parameter is a two dimensional matrix where values of the two dimensional matrix indicate a quantity of times to apply a cryptographically based function to a segment of the encrypted anonymized data using the second cryptographic key.

13. The method of claim 12, wherein a quantity of columns in the two dimensional matrix indicate a quantity of copies of the encrypted anonymized data to generate; and the instructions to analyze the encrypted anonymized data includes instructions to generate a plurality of data views, each data view corresponding to an application of a respective column of the two dimensional matrix to a respective copy of the encrypted anonymized data.

14. The method of claim 13, wherein each data view includes:

a portion that preserves relationships among the first network data associated with a first tenant identifier; and a portion that fails to preserve relationships among the first network data associated with a first tenant identifier.

15. The method of claim 12, wherein a quantity of rows in the matrix correspond to a quantity of segments in the encrypted anonymized data.

16. The method of claim 12, wherein the anonymizing of the first encrypted data includes:

pairing each row of the matrix with a respective segment of the first encrypted data; and modifying an ordering of rows of the matrix and corresponding segments of the first encrypted data.

17. The method of claim 11, further comprising:

encrypting second data including a second tenant identifier using the second cryptographic key to generate second encrypted data; and anonymizing the second encrypted data to generate a portion of the anonymized data, the anonymizing of the second encrypted data including segmenting the second encrypted data based at least in part on the encrypted second tenant identifier, the anonymizing of the second encrypted data preserving relationships among the second data associated with a second tenant identifier.

18. The method of claim 17, wherein at least one segment of encrypted anonymized data includes first encrypted data and second encrypted data.

19. The method of claim 11, wherein the determining of verification results from the received analysis data includes determining a quantity of times at least one segment of the verification results that correspond to the network data was encrypted.

20. The method of claim 11, further comprising transmitting the second cryptographic key.

21. A node for anonymizing network data for analysis by another node, the node comprising:
an encryption module configured to encrypt first network data including a first tenant identifier using a first cryptographic key to generate first encrypted data;
an anonymization module configured to:
anonymize the first encrypted data to generate anonymized data, the anonymizing of the first encrypted data including segmenting the first encrypted data based at least in part on the encrypted first tenant identifier, the anonymizing of the first encrypted data preserving relationships among the first network data associated with the first tenant identifier;
encrypt the anonymized data using a second cryptographic key to generate encrypted anonymized data;
transmit the encrypted anonymized data, at least one analysis parameter, at least one security policy and instructions to analyze the encrypted anonymized data using the at least one analysis parameter, the at least one security policy and the second cryptographic key;
a verification module configured to:
receive analysis data resulting from the analysis of the encrypted anonymized data; and
determine verification results from the received analysis data.

22. The node of claim 21, wherein the at least one analysis parameter is a two dimensional matrix where values of the two dimensional matrix indicate a quantity of times to apply a cryptographically based function to a segment of the encrypted anonymized data using the second cryptographic key.

* * * * *